US011405247B2

United States Patent
Baier et al.

(10) Patent No.: US 11,405,247 B2
(45) Date of Patent: Aug. 2, 2022

(54) IMPULSE-RADIO RECEIVER AND METHOD

(71) Applicant: NXP USA, Inc., Austin, TX (US)

(72) Inventors: Thomas Baier, Graz (AT); Manuel Lafer, Graz (AT); Gert Holler, Plankenwarth (AT); Salvatore Drago, Eindhoven (NL)

(73) Assignee: NXP USA, Inc., Austin, TX (US)

( * ) Notice: Subject to any disclaimer, the term of this patent is extended or adjusted under 35 U.S.C. 154(b) by 806 days.

(21) Appl. No.: 16/221,882

(22) Filed: Dec. 17, 2018

(65) Prior Publication Data

US 2022/0200654 A1     Jun. 23, 2022

(51) Int. Cl.

| H04L 27/26 | (2006.01) |
|---|---|
| H04L 27/00 | (2006.01) |
| H04L 27/38 | (2006.01) |

(52) U.S. Cl.
CPC ...... *H04L 27/0014* (2013.01); *H04L 27/2647* (2013.01); *H04L 27/38* (2013.01); *H04L 2027/003* (2013.01); *H04L 2027/0067* (2013.01)

(58) Field of Classification Search
CPC .......... H04B 1/10; H04B 17/00; H04B 17/30; H04B 17/391; H04J 3/06; H04J 3/0661; H04L 1/20; H04L 7/04; H04L 25/02; H04L 27/06; H04L 27/38; H04L 27/0014; H04L 27/2647; H04L 29/06; H04L 29/08; H04W 12/06; H04W 48/16; H04W 52/02
USPC ....... 375/147, 219, 227, 260, 267, 316, 340, 375/346
See application file for complete search history.

(56) References Cited

U.S. PATENT DOCUMENTS

| 2013/0243131 A1* | 9/2013 | An ............................ H04L 1/02 375/340 |
| 2015/0003424 A1* | 1/2015 | Hund .................... H04J 3/0605 370/336 |
| 2016/0234684 A1* | 8/2016 | Hekstra .................... H04K 3/86 |
| 2017/0359134 A1 | 12/2017 | Baier et al. |

OTHER PUBLICATIONS

Baronkin et al.; "Cramer-Rao Lower Bound for Frequency estimation in Multipath Rayleigh Fading Channels"; presented at the 2001 IEEE International Conference on Acoustics, Speech, and Signal Processings Proceedings on May 7-11, 2001; 4 pages.

(Continued)

*Primary Examiner* — Shawkat M Ali

(57) ABSTRACT

A communication device and method include a reconfigurable receiver that is reconfigurable between communication, ranging and radar modes. The reconfigurable receiver includes a mixer configured to mix digital samples with a carrier phase estimate signal and configured to generate in-phase digital samples based on the carrier phase estimate. The reconfigurable receiver further includes a symbol correlator configured to correlate against the in-phase digital samples and generate correlated data, and a symbol binning unit configured to bin the correlated data and generate a first order channel impulse response estimate. The reconfigurable receiver yet further includes a multiplexer configured to switch the digital samples to the symbol binning unit when the reconfigurable receiver is configured in radar mode and to switch the correlated data to the symbol binning unit when the reconfigurable receiver is configured in a ranging mode.

18 Claims, 19 Drawing Sheets

(56) References Cited

OTHER PUBLICATIONS

Joseph, Onaya Oyoo; "Synchonization of Direct Sequence Spread Spectrum Signals"; project for Bachelor of Science in Electrical & Electronic Engineering; Jun. 20, 2008; located at http://eie.uonbi.ac.ke/sites/default/files/cae/engineering/eie/SYNCHRONIZATION%20OF%20DIRECT%20SEQUENCE%20SPREAD%20SPECTRUM%20SIGNALS.pdf; 51 pages.

IEEE Standard 802.15.4-2015; "IEEE Standard for Low-Rate Wireless Personal Area Networks (WPANs)"; approved Dec. 5, 2015; 709 pages.

Wong, Tan F.; "Spread Spectrum & CDMA—Chapter 5: Spreading Code Acquisition and Tracking"; located at: http://wireless.ece.ufl.edu/twong/Notes/CDMA/ch5.pdf; Apr. 23, 2018, 22 pages.

IEEE, "IEEE Standard for Local and metropolitan area networks—Part 15.4: Low-Rate Wireless Personal Area Networks (LR-WPANs)", IEEE Computer Society, Sep. 5, 2011, 314 pages.

\* cited by examiner

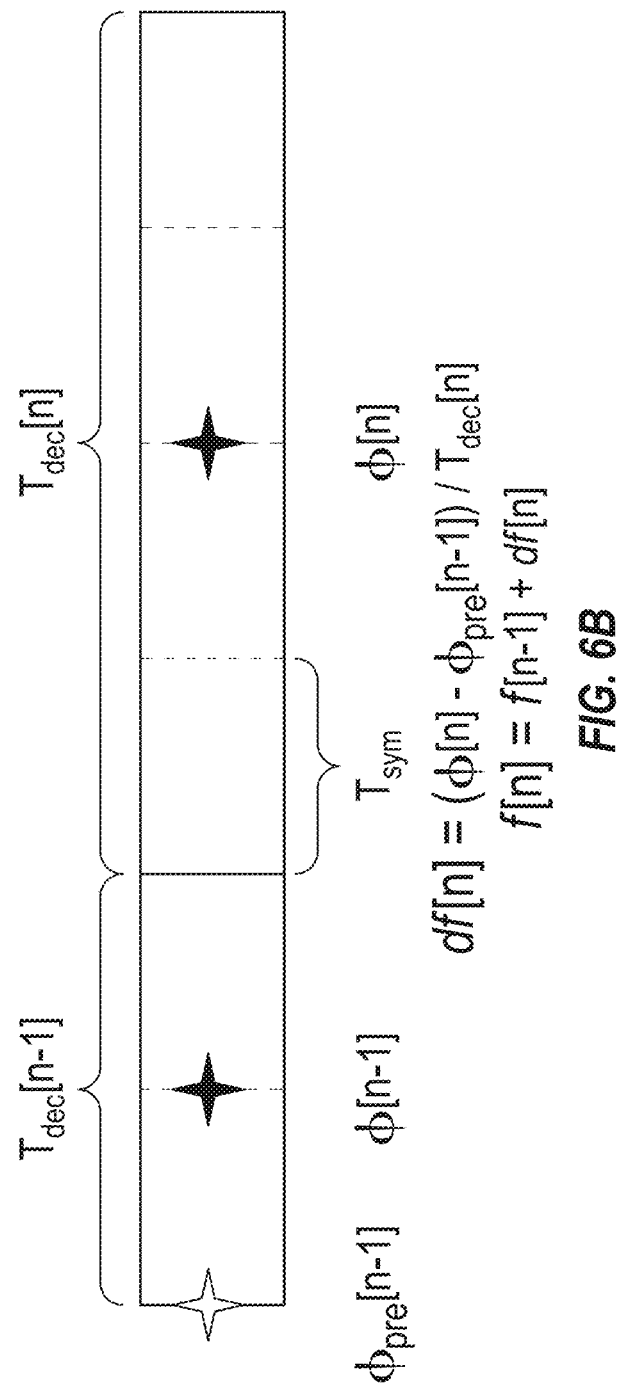

IMPULSE-RADIO RECEIVER AND METHOD

FIELD OF THE DISCLOSURE

The present disclosure relates generally to radio frequency (RF) circuits, and more particularly to RF circuits for ranging, communication, and radar.

BACKGROUND OF THE DISCLOSURE

Ultra-WideBand (UWB) Radio Frequency (RF) applications have been developed that are capable of accurate distance measurement to objects in the surrounding environment or between several UWB devices. These UWB applications have required receiver architectures tailored to specific applications, such as wireless data communication, ranging, and radar. Systems implementing more than one of these applications have required multiple receivers which often include redundant components. Furthermore, some of the receiver components may have been unduly complex in the present environment of advanced signal processing.

Such RF applications may employ an Impulse-Radio Ultra-WideBand (IR-UWB) system where high sensing accuracy and/or high data-rates may be required. Such high accuracy also requires significant processing capability in a digital baseband subsystem related to the high sampling rates (>500 Msp/s) and the low SNR of the received signal. Improving the signal processing demands, including synchronization, estimation of channel impulse response, and component reusability, may improve performance and reduce redundant structures in ranging and radar operations.

BRIEF DESCRIPTION OF THE DRAWINGS

FIG. 6B illustrates modification of an algorithm to increase decimation after every output samples of the decimator.

DETAILED DESCRIPTION

Figure 1:
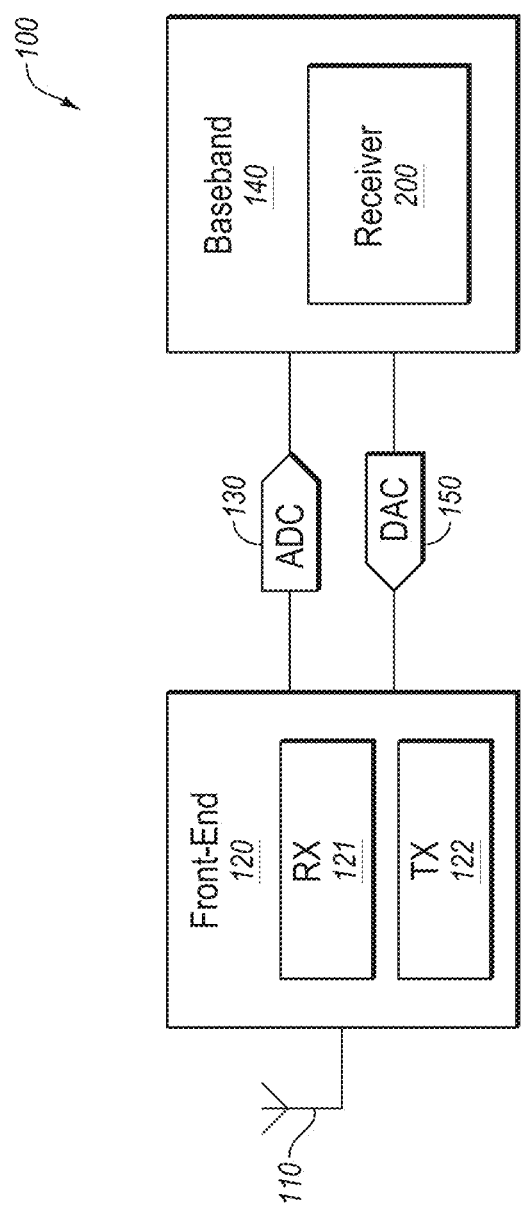
FIG. 1 illustrates a simplified block diagram of part of a wireless Impulse Response (IR) Ultra-WideBand (UWB) receiver in a communication device.

The present disclosure encompasses a variety of embodiments for synchronization, estimation of the channel impulse, and a reconfigurable receiver architecture for re-usability of the hardware in ranging, communication, and radar operations.

Wireless UWB communication is a technique for transmitting high-bandwidth signals at a bandwidth greater than 500 MHz. Wireless communication techniques may utilize half or full duplex techniques for data transmission.

In one embodiment, a communication device and method include a reconfigurable receiver that is reusable between ranging, radar modes, and data reception. The reconfigurable receiver includes a mixer configured to shift the phase of the complex, digital samples with a carrier phase estimate signal and configured to generate mixed digital samples based on the carrier phase estimate. The reconfigurable receiver further includes a symbol correlator configured to correlate the mixed digital samples and generate correlated data, and a symbol binning unit configured to further integrate the correlated data at a different downsampling phase which is used to generate a first order channel impulse response estimate. The reconfigurable receiver yet further includes a multiplexer configured to switch the digital samples to the symbol binning unit when the reconfigurable receiver is configured in a radar mode and to switch the correlated data to the symbol binning unit when the reconfigurable receiver is configured in a ranging mode.

Radar and ranging are techniques for calculating a distance either to objects in the surrounding area or between two devices using Time-of-Arrival (ToA) and Time-of-Departure (ToD) measurements for RF packets transmitted there between. In a multipath environment, the ToAs for the most direct (shortest) path, i.e. the 'Line-of-Sight' (LoS) path, between the two devices should be measured and used for accurately calculating the distance between two devices. Accordingly, the first arriving path for the respective RF packet needs to be found. In order to enable a receiving device to identify the first arriving path for an RF packet, the receiving device derives a channel estimate to describe the multipath environment.

In another embodiment, a method in a reconfigurable receiver is disclosed. The method includes mixing digital samples with a carrier phase estimate signal in a mixer and generating mixed digital samples based on the carrier phase estimate. The method also includes correlating the mixed digital samples and generating correlated data and binning the correlated data in a symbol binning unit and generating a channel impulse response estimate. The method further includes switching the digital samples to the symbol binning unit when the reconfigurable receiver is configured in radar mode and switching the correlated data to the symbol binning unit when the reconfigurable receiver is configured in a ranging mode.

In yet another embodiment, a communication device includes a processor configured to include a software correlator. The communication device also includes a front-end circuit including an internal interfering path for a transmit signal between a power amplifier and a low noise amplifier, the front-end circuit further configured to transmit and receive the transmit signal over a reflected path, with the transmit signal upconverted and downconverted based on a local oscillator (LO) frequency. An analog-to-digital converter (ADC) samples the transmit signal into ADC samples. The communication device further includes a reconfigurable receiver, including a symbol binning unit configured to bin the ADC samples, with the software correlator further configured to correlate the binned ADC samples. The processor is further configured to identify an in-phase minimum amplitude LO frequency based on a minimum in-phase amplitude of the transmit signal traversing the internal interfering path. The processor is yet further configured to distinguish between an in-phase received signal in a reflected path from a target and an in-phase received signal in the internal interfering path with the distinguishing based on configuring the local oscillators in the communication device with the in-phase minimum amplitude LO frequency.

In another embodiment, the processor may be further configured to identify a quadrature minimum amplitude LO frequency based on the minimum quadrature amplitude of the transmit signal traversing the internal interfering path. The processor may be yet further configured to distinguish between a quadrature received signal in a reflected path from a target and a quadrature received signal in the internal interfering path based on configuring the local oscillators in the communication device with the quadrature minimum amplitude LO frequency.

FIG. 1 illustrates a simplified block diagram of an example of part of a wireless radio frequency (RF) communication device 100. The communication device 100 includes an antenna 110 for receiving and transmitting RF signals over an air interface. The antenna 110 is coupled to the front-end circuit 120. The front-end circuit 120 typically consists of a front-end receiver circuit 121 and a front-end transmitter circuit 122. The front-end receiver circuit includes, for example, a low noise amplifier (LNA), down-conversion mixer and band-pass filter, and the front-end transmitter circuit includes, for example, a mixer, filter and power amplifier (PA).

The front-end receiver circuit 121 of the front-end circuit 120 is coupled to a baseband processing module 140 of the communication device 100 via an analog-to-digital converter (ADC) 130, via which received signals are passed from the front-end circuit 120 to a reconfigurable receiver 200 in the baseband processing module 140. While only one ADC 130 is illustrated, it is understood that either a single ADC may provide both in-phase and quadrature phase samples, such as by multiplexing the ADC, or an ADC may be provided for each of the in-phase and quadrature phase paths. The front-end transmitter circuit 122 of the front-end circuit 120 is coupled to the baseband processing module 140 via a digital-to-analog converter (DAC) 150, via which signals to be transmitted are passed from the baseband processing module 140 to the front-end circuit 120. According to some example embodiments, the baseband processing module 140 of the communication device 100 is arranged to perform data demodulation and decoding, channel estimation and synchronization on data packets within received RF signals.

Figure 2:
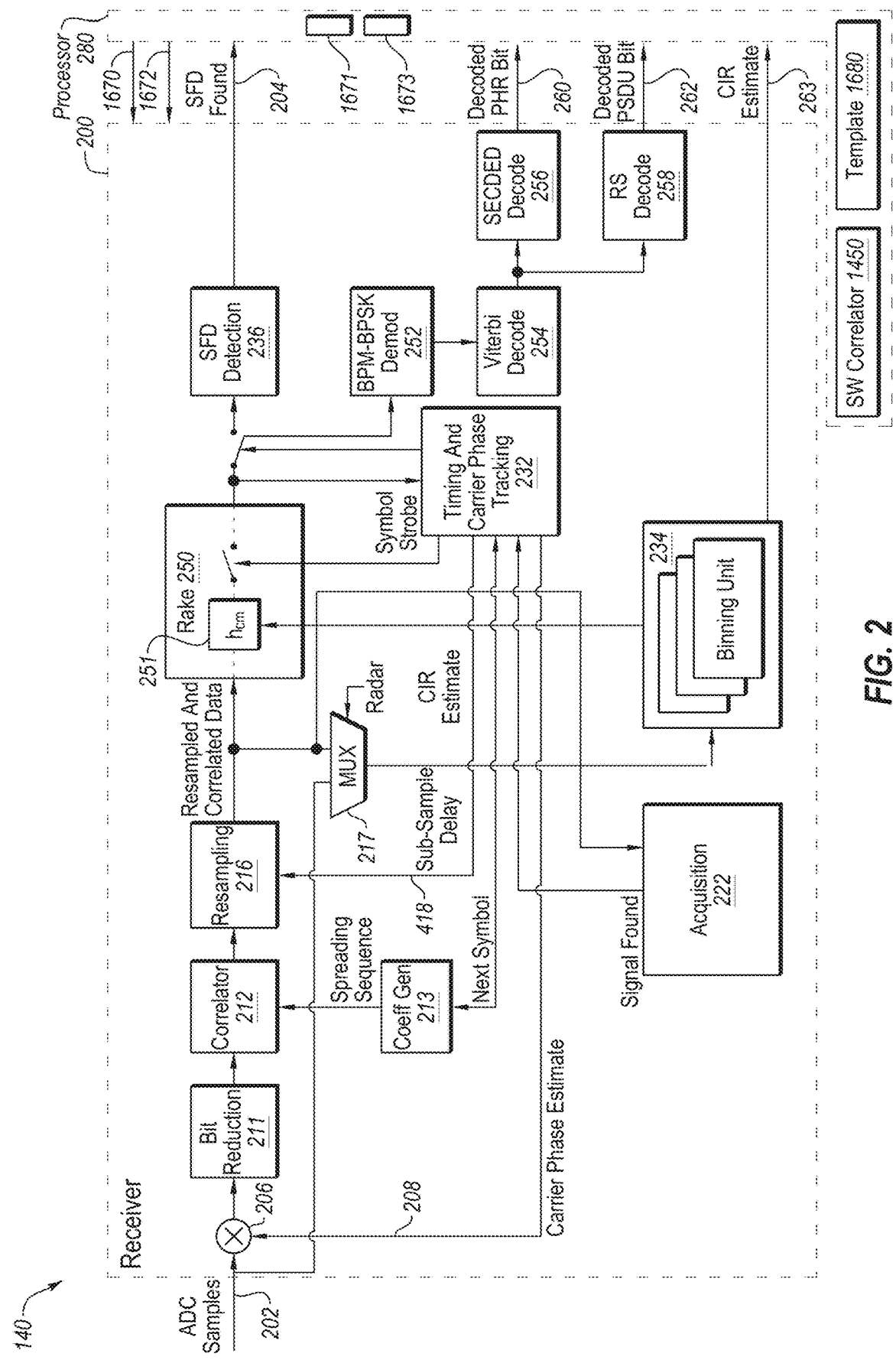
FIG. 2 illustrates a simplified block diagram of a reconfigurable IR-UWB receiver in a baseband sub-module of a communication module.

FIG. 2 illustrates a simplified block diagram of a reconfigurable receiver 200 which forms part of the baseband processing module 140. The reconfigurable receiver 200 may be configured to perform ranging, communication, and radar operations by reusing or reconfiguring the various components in the reconfigurable receiver 200. The reconfigurable receiver 200 may perform both processing of the preamble and payload of data packets by reusing various receiver components for each of the preamble process and payload process. The reconfigurable receiver 200 receives on an input the ADC samples 202 from the ADC 130 of FIG. 1. The reconfigurable receiver 200, when configured as a preamble receiver (FIG. 3), outputs a start of frame delimiter (SFD) signal 204. The reconfigurable receiver 200, when configured as a payload receiver (FIG. 13), outputs the decoded PHR bits 260 and decoded PSDU bits 262.

The reconfigurable receiver 200 includes a mixer 206 configured to receive the samples from the ADC 130 of FIG. 1 and a carrier phase estimate signal 208 when configured as a communication or ranging receiver. The mixer 206 may couple to a bit reduction circuit 211 for power and area reduction, which further couples to a correlator 212. The correlator 212 may couple to a resampling circuit 216 which couples to a rake receiver 250, the acquisition circuit 222 and binning unit 234 when the reconfigurable receiver 200 is configured in ranging mode. When the reconfigurable receiver 200 is configured in radar mode, the radar mode multiplexer 217 provides the samples 202 directly to the binning unit 234.

The correlator 212, during the preamble process, correlates the preamble and, during the payload process, the correlator 212 may be configured as a burst correlator by receiving a spreading sequence from a coefficient generator 213. Further, the resampling circuit 216 may be configured to provide interpolation/subsampling of the correlated signal based on a sub-sample delay. The resampled and correlated data is then processed by the rake receiver 250 including an accumulator 251. In the preamble process, the accumulator 251 generates an output signal including the energy of several multi-path components. The selection and weighting of the multi-path components is based on a channel impulse response (CIR) estimate 263 based of the content of the binning unit 234.

The reconfigurable receiver 200 further includes a timing and carrier phase tracking circuit 232. The timing and timing and carrier phase tracking circuit 232 may be configured to provide carrier phase estimates, symbol strobes, sub-sample delays, switch controls, and other control signals such as a next symbol strobe signal to generated new coefficients for payload symbol correlation. The reconfigurable receiver 200 may further include a binning unit 234 configured to generate the Channel Impulse Response (CIR) estimate 263 from the transmitting device to the receiving device which may be used for the accumulator 251 and the previously described ranging purposes. The reconfigurable receiver 200 further includes an acquisition circuit 222 as further described below with respect to FIG. 9.

The reconfigurable receiver 200 further includes an SFD detection circuit 236, a demodulation circuit 252 (e.g. for BPM-BPSK), an inner decoding circuit 254 (e.g. Viterbi), and other decoding circuits (e.g. SECDED 256, and Reed Solomon decoder 258). In the preamble process, the output of the rake receiver 250 couples to the SFD detection circuit 236 which in turn generates the start of frame delimiter (SFD) signal 204 which indicates the start of the data-content or the end of the preamble has been identified. In the payload process, the output of the rake receiver 250 couples to a demodulator circuit 252 (e.g., BPM-BPSK), an inner decoding circuit 254 (e.g. Viterbi), and outer decoder (e.g. SECDED 256 and a Reed Solomon (RS) decoder 258) for generating the decoded PHR bits 260 and decoded PSDU bits 262.

Further, when the reconfigurable receiver 200 is configured in radar mode, the binning unit 234 generates a first order channel impulse response (CIR) estimate 263 which represents the impulse response from the transmitter to the receiver of the same device.

The baseband processing module 140 further includes a processor 280 for receiving the various signals and for performing further processing of the CIR estimate 263 in when the reconfigurable receiver 200 is configured in ranging or radar mode.

Figure 3:
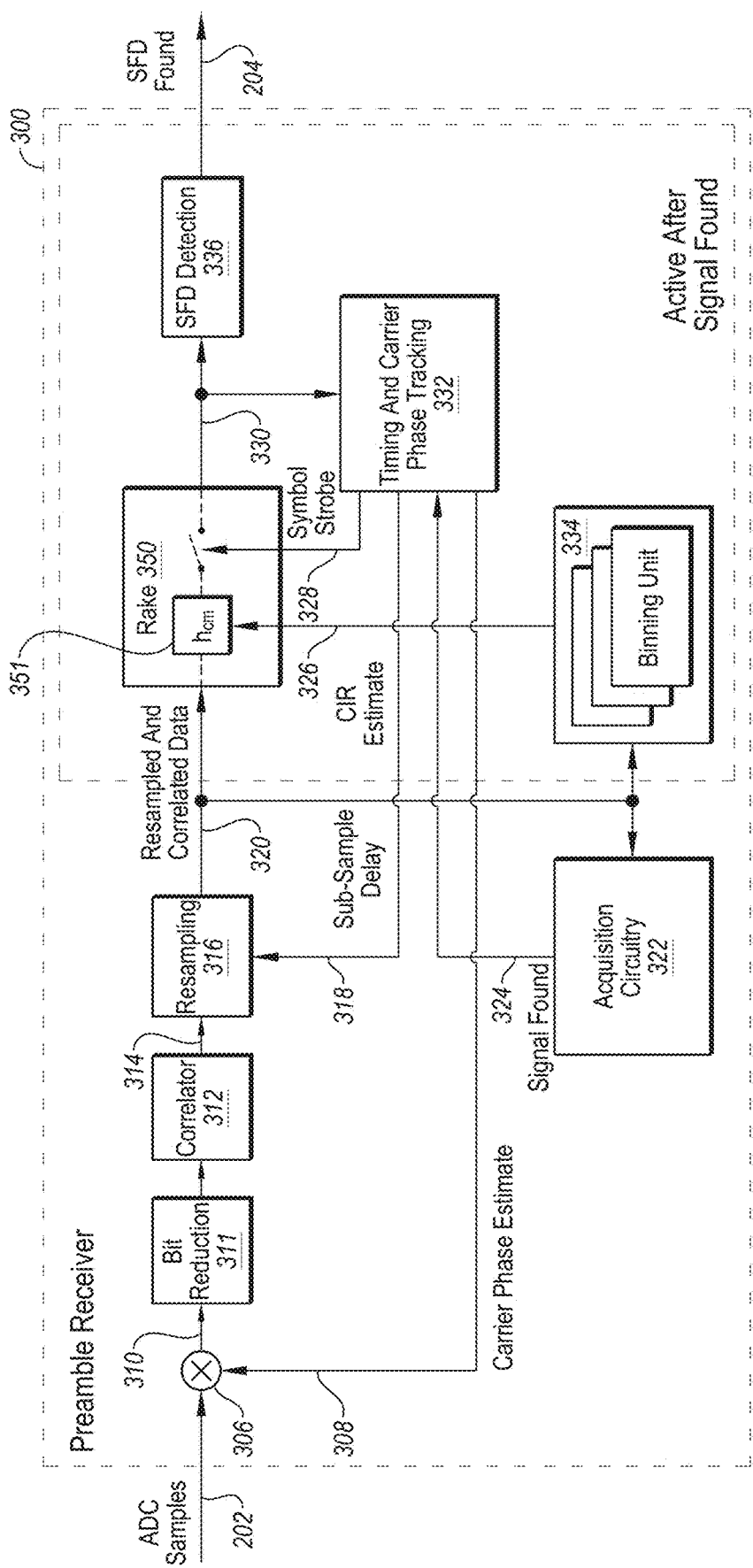
FIG. 3 illustrates the active elements of the reconfigurable receiver of FIG. 2 configured for operating in the preamble process.

FIG. 3 illustrates the active elements of the reconfigurable receiver 200 of FIG. 2 configured for operating in the preamble process. The preamble symbol structure is different from the payload symbol structure. In one example, the payload symbol structure may apply a longer symbol length and/or different spreading methods. A reconfigurable receiver 300 provides the components (i.e., hardware) to be reused between preamble and payload processes.

The reconfigurable receiver 300 receives the ADC samples 202, as processed by the ADC 130 of FIG. 1 and generates the indication that the start of frame delimiter (SFD) signal 204 has been found. As stated, the reconfigurable receiver 300 includes components that are reusable between preamble and payload configurations. Specifically, the reconfigurable receiver 300 includes a mixer 306 for receiving the ADC samples 202 and a carrier phase estimate signal 308 and the mixer 306 generates a mixed signal 310. A correlator 312 receives the mixed signal 310 and generates a correlated signal 314. A resampling circuit 316 resamples the correlated signal 314 based on a sub-sample delay 318 and generates resampled and correlated data 320.

A rake receiver 350 includes an accumulator 351 and receives the resampled and correlated data 320 and, using a channel impulse response (CIR) estimate 326 generated by a binning unit 334 and a symbol strobe 328 for down-sampling, generates a rake receiver output signal 330 which includes the combined energy of the selected multi-path components to increase SNR. The rake receiver output signal 330 is down-sampled based on a symbol strobe 328 which indicates the optimum down-sampling time with highest SNR. The rake receiver output signal 330 couples to the SFD detection circuit 336 which in turn generates the start of frame delimiter (SFD) signal 204 which indicates the start of the frame has been identified. The rake receiver output signal 330 further couples to a timing and carrier phase tracking circuit 332 which generates the carrier phase estimate signal 308 and which is initialized by the synchronization data as for example symbol strobe signal 328 based in-part on the signal-found signal 324 from the acquisition circuit 322.

The reconfigurable receiver 300 illustrates a configuration where the placement of the mixer that is used to correct the carrier phase is relevant to obtain cross-correlation results which minimize the effect of frequency offsets between devices which is required for high sensitive channel estimation with low unwanted side-lobe level of the cross-correlation.

In operation during the preamble process configuration of the reconfigurable receiver 300, the reconfigurable receiver 300 is able to derive a channel estimate in relation to a transmitting device using known patterns (i.e., a template) within a received packet from the transmitting device. For example, in IR-UWB (Impulse Radio—Ultra-WideBand) systems, such as defined in IEEE 802.15.4, a preamble comprising repeating synchronization symbols and a Start-of-Frame Delimiter (SFD) is placed in front of a payload segment. In IR-UWB receivers, the repeating synchronization symbols within the preamble of a received packet are typically used to derive a channel estimate for the received packet.

In a coherent receiver system, synchronization algorithms are required to keep the receiver aligned to the carrier phase and to the modulation timing of the received signal that is transmitted from a device having a different phase and frequency reference. For IR-UWB (referred later as DSSS-like) and general for direct sequence spread spectrum (DSSS) devices with ranging functionality, maintaining the cross-correlation properties of the signal may be useful as the side-lobes in the cross-correlation may mask or hide a weak first path. Even if symbols with perfect periodic auto-correlation functions are used, a phase rotation caused by frequency offset, may introduce side-lobes if not corrected in front of the correlation process.

Furthermore, frequency differences between the transmitting and receiving devices may result in errors. The receiving devices may be classified as coherent or non-coherent receivers. Coherent receivers rely on the phase of the received signal to make adjustments to the carrier down-conversion (be it digital or analog) in the receiving device.

In a first aspect, a coherent signal detection algorithm may address high frequency errors in DSSS-like systems with a processing effort level on the order of non-coherent signal detection algorithms. High frequency offsets caused by tolerance or process/temperature drift of the reference clock (e.g. crystal oscillator) between two devices limit the time available to coherently correlate without frequency corrections.

Furthermore, the signal may be completely lost when the carrier phase rotates by 360° during the correlation period, resulting in a limited coherent integration time ("coherence time"). The coherence time may be limited to not exceed 180° rotation resulting in about 4 dB of loss.

Furthermore, the signal-to-noise ratio (SNR) may be sufficiently low, or even negative, in highly sensitive receivers after coherent integration over the available coherence time. Accordingly, receivers may apply a non-coherent integration (e.g. integration of the envelope of the signal instead of I/Q signal) afterwards to increase the SNR. However non-coherent integration is subject to SNR losses in cases of low or negative SNR of the incoming signal. Also, the output SNR of an envelope detector decreases ~2 dB for every 1 dB decrease of input SNR at negative input SNR.

An example when such a case is relevant can be given in the context of the 110 kbit/s mode of the IEEE Standard 802.15.4 HRP-IRUWB PHY. Due to a chosen modulation scheme, the demodulator can continue to demodulate down to an Eb/N0=3 dB while still operating with a packet error rate (PER) below 10% for a 20 byte payload. If an offset of 30 ppm needs to be considered for crystal oscillators, a total system (RX+TX device) offset of 60 ppm (30 ppm RX+30 ppm TX) needs to be handled by a receiver. At an 8 GHz carrier frequency, the coherence time then may be limited to 1.042 µs. For an Eb/N0=3 dB at 110 kBit/s this means the SNR after 1.042 µs correlation time is only −6.4 dB. Accordingly, the below examples use a symbol period to match with the coherence time of 1.042 µs.

The synchronization in FIG. 3 illustrates a synchronization loop (including carrier phase estimate signal 308) suitable for DSSS-like systems (e.g., IR-UWB according to IEEE 802.15.4) with a frequency correction before the symbol correlator. Additionally the phase and timing recovery is placed after the rake receiver 350 which combines the energy of several multi-path components to increase SNR for estimation.

Such a recovery may be based on a $2^{nd}$ order PLL initialized by a coarse timing and frequency of the acquisition block. The reconfigurable receiver 300 further includes the placement of the fractional resampling circuit 316 before the symbol binning unit 334 thereby deriving a $1^{st}$ order estimate of the channel impulse response. The resampling circuit 316 addresses sub-sample timing alignment and reduces additional jitter introduced by a limited sampling rate of the ADC 130, thereby avoiding smearing of the pulse in the binning unit 334 in case the timing drifts due to frequency offset. Furthermore, the main parts of the synchronization loop may also be reused when the reconfigurable receiver 300 is configured as a payload receiver for the payload process.

Figure 4:
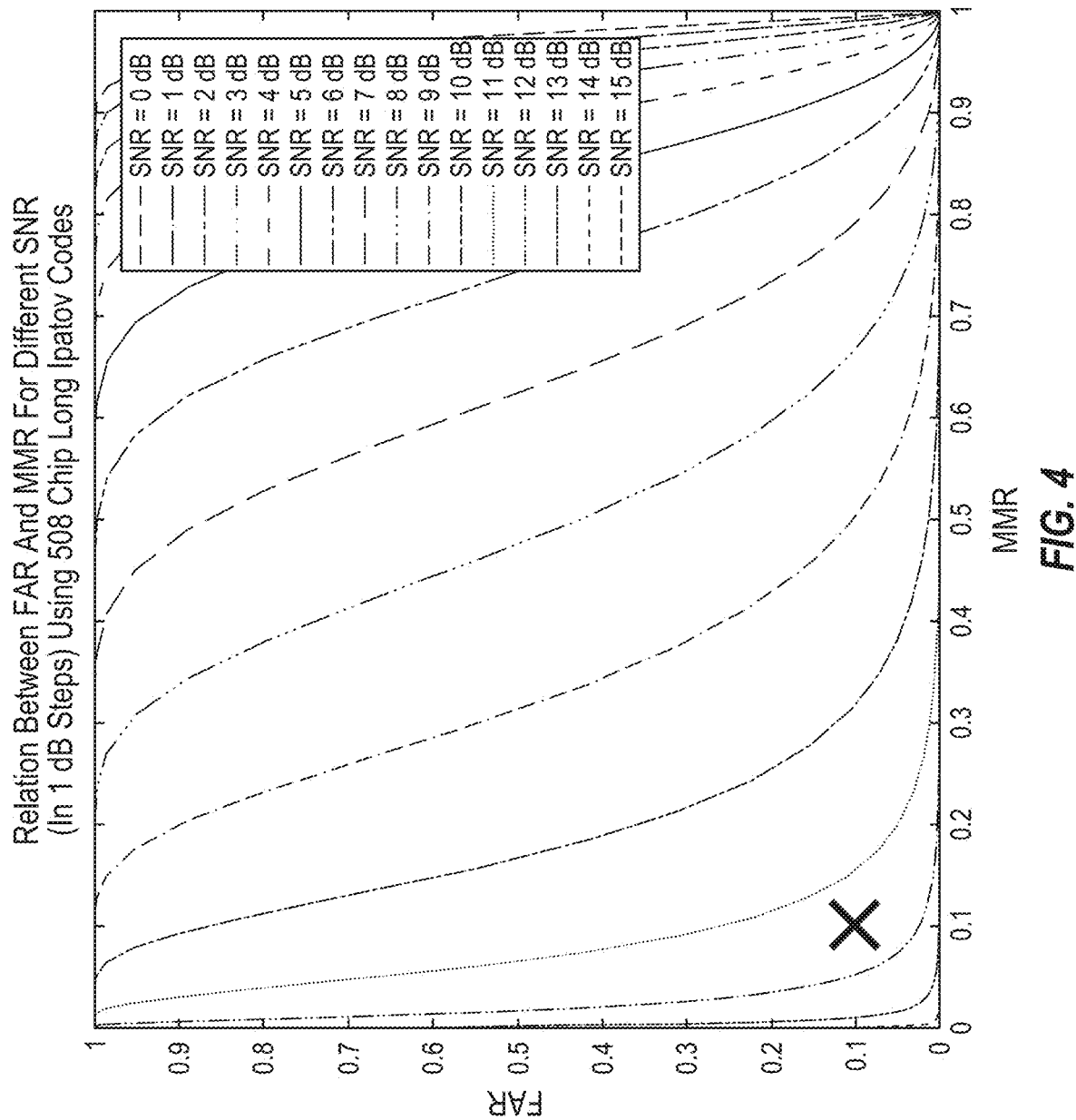
FIG. 4 illustrates the relation between Missed Message Rate (MMR) and False Alarm Rate (FAR) at certain SNRs for a reconfigurable receiver.

FIG. 4 illustrates the relation between Missed Message Rate (MMR) and False Alarm Rate (FAR) at certain SNRs for a reconfigurable receiver 200 of FIG. 2. The relation is given by a certain threshold level. Furthermore, reliable signal detection results from a positive SNR. Accordingly and as illustrated in FIG. 4, a MMR/FAR compromise of 10%/10% maybe considered as "reliable" enough and results in an required SNR of +11.5 dB to achieve this compromise with associated threshold setting. Assuming the previously given −6.4 dB SNR with a symbol period matching the allowed coherent integration time without frequency correction, coherent integration with frequency correction of around 71 symbols would be needed to reach the SNR of about 17.9 dB. For an envelope detector configuration, however, more than 700 symbols would need to be integrated for the same input SNR of 17.9 dB to reach the 10%/10% MMR/FAR compromise.

Conventional signal detection algorithms may perform poorly under negative SNR conditions, resulting in either significantly increased detection time or limited sensitivity. One alternative to non-coherent integration uses Fast Fourier Transform (FFT) based algorithms which address the coherence problem by trying different frequency hypotheses before integration. However, the hardware complexity cannot be compared to non-coherent algorithms since the hardware effort increases at least logarithmically with the number of used frequency hypotheses (i.e., the FFT size). On the other hand, the acquisition algorithm described herein provides FFT-like performance with simplified hardware complexity which is on the order of the hardware complexity associated with an envelope detector.

Further, the correlator 212 of FIG. 2 may be reused between the preamble and payload processes by reconfiguring the correlator 212 for different modulation schemes. For example, in the preamble process configuration as illustrated by FIG. 3, the correlator 312 may be configured for IR-UWB according to IEEE Standard 802.15.4 since the preamble symbols are spread with a constant code, upsampled by a specific deltaL (e.g. 4), and thus the pulses are separated by '0's.

Figure 13:
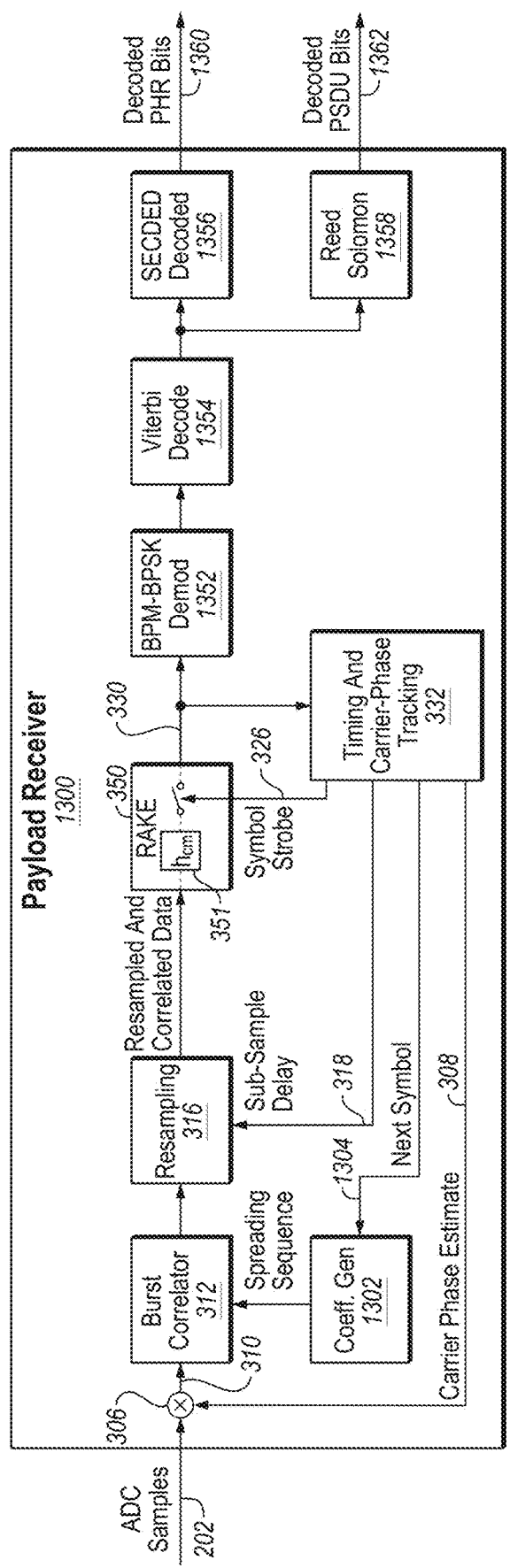
FIG. 13 illustrates the active elements of the reconfigurable receiver configured as a payload receiver suitable for segmented correlation.

The correlator 212 of FIG. 2 may also be reused for the payload process where the payload symbols are modulated in bursts without separation of the pulses, as illustrated in FIG. 13. In addition, the payload symbols may be longer than the preamble symbols and may require a longer correlator.

As described above, a coherent signal detection algorithm capable of dealing with high frequency offset, needs to estimate the frequency offset. In one approach, non-coherent approach to estimate frequency, is a phase-discriminator followed by a low-pass filter to reduce noise on the estimate. One kind of phase discriminator is described with following formula:

$$f_{est}[n] = a\tan 2(\text{imag}(x[n]),\text{real}(x[n])) - a\tan 2(\text{imag}(x[n-1]),\text{real}(x[n-1])) \quad \text{[Eq. 1]}$$

and another one with the following formula:

$$A_{est}[n]^2 \cdot e^{f_{est}[n]} = x[n] \cdot \text{conj}(x[n-1]). \quad \text{[Eq. 2]}$$

Accordingly, without additional filtering after the estimator, the frequency estimates are equivalent, with the difference being visible after the filter operation which, in the first case, is applied on the real value frequency estimate, and, in the second case, is applied on the complex signal which phase is equivalent to the frequency. In both cases, a linear low pass filter may not provide desired or optimum results due to the non-linearity of the a tan of the squaring operation.

However, just considering two samples for the estimator without any additional averaging/filtering afterwards, a simple phase discriminator achieves sensitivity close to (about 1 dB above) the Cramer Rao Lower Bound (CRLB). This results in a starting point of the proposed acquisition algorithm which suggests coherently applying any linear filter operation before the non-linearity.

Figure 5:
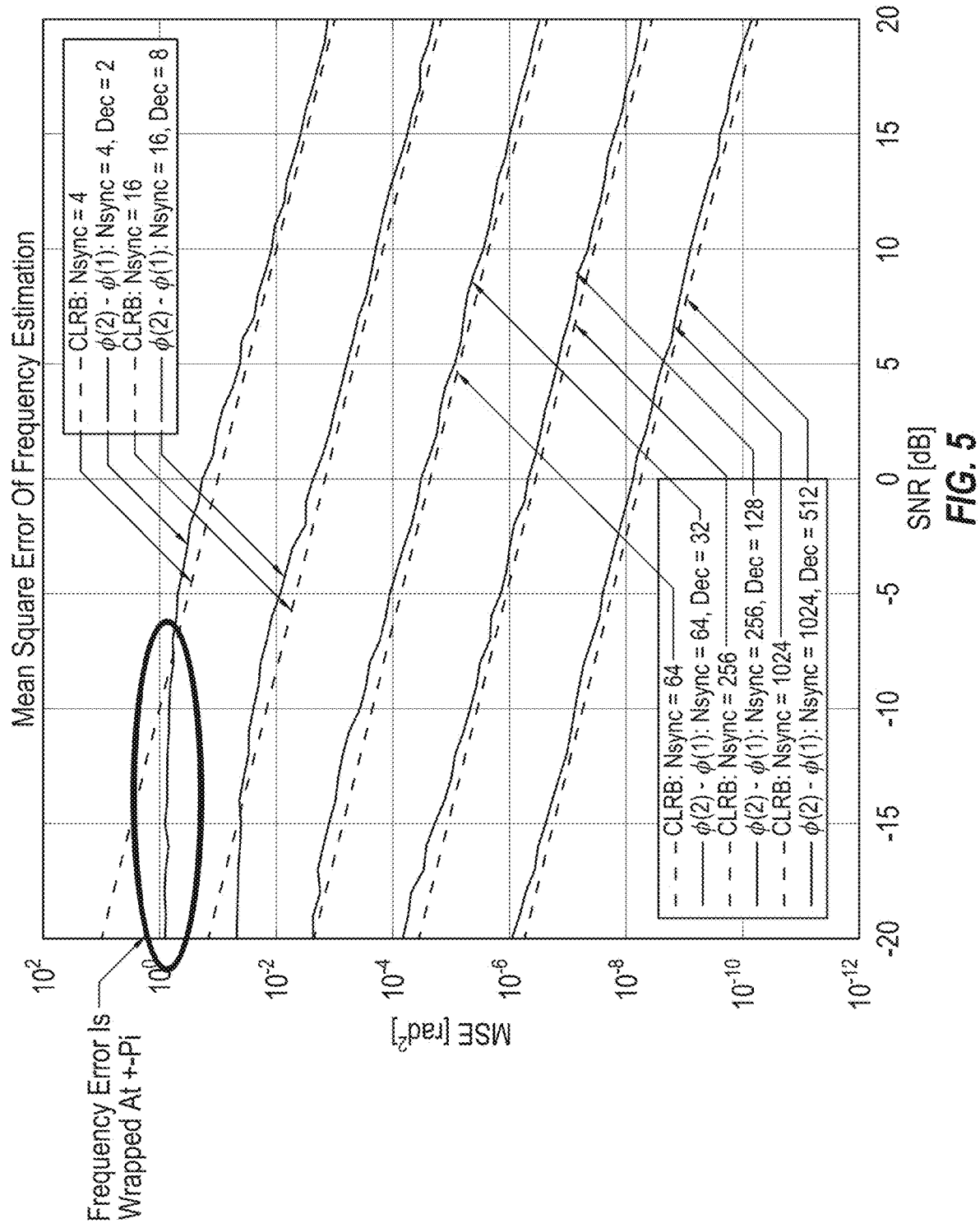
FIG. 5 illustrates the estimation error of a two-sample phase discriminator with a different number of coherently integrated and decimated symbols as compared to the Cramer Rao Lower Bound (CRLB).

FIG. 5 illustrates the estimation error of a two-sample phase discriminator with a different number of coherently integrated and decimated symbols (Dec) up-front as compared against the CRLB. As noted above, integration before the frequency estimator should be limited to not exceed a phase rotation of 180° during the integration interval, otherwise, losses of >3 dB may be observed. In addition, the phase discriminator wraps at ±180° and thus cannot estimate higher offsets correctly due to aliasing.

To still allow close to CRLB performance at high frequency offsets and long integration periods, the two sample estimator scheme may be modified to a successive estimation with an increasing integration period in every step. For example, the algorithm starts without any integration and discriminates the phase of two consecutive symbols, resulting in a first coarse frequency estimate within the range of $\pm f_{sym}/2$.

In the next step, the frequency estimate is used to correct frequency before integration of twice the number of symbols as in the previous step. This results in a refined frequency estimate which is consequently applied to correct frequency for the next, even longer, integration period. This successive refinement may be repeated as long as there is time available for synchronization. Usually the limiting element is the length of the preamble sequence in the frame.

Figure 6A:
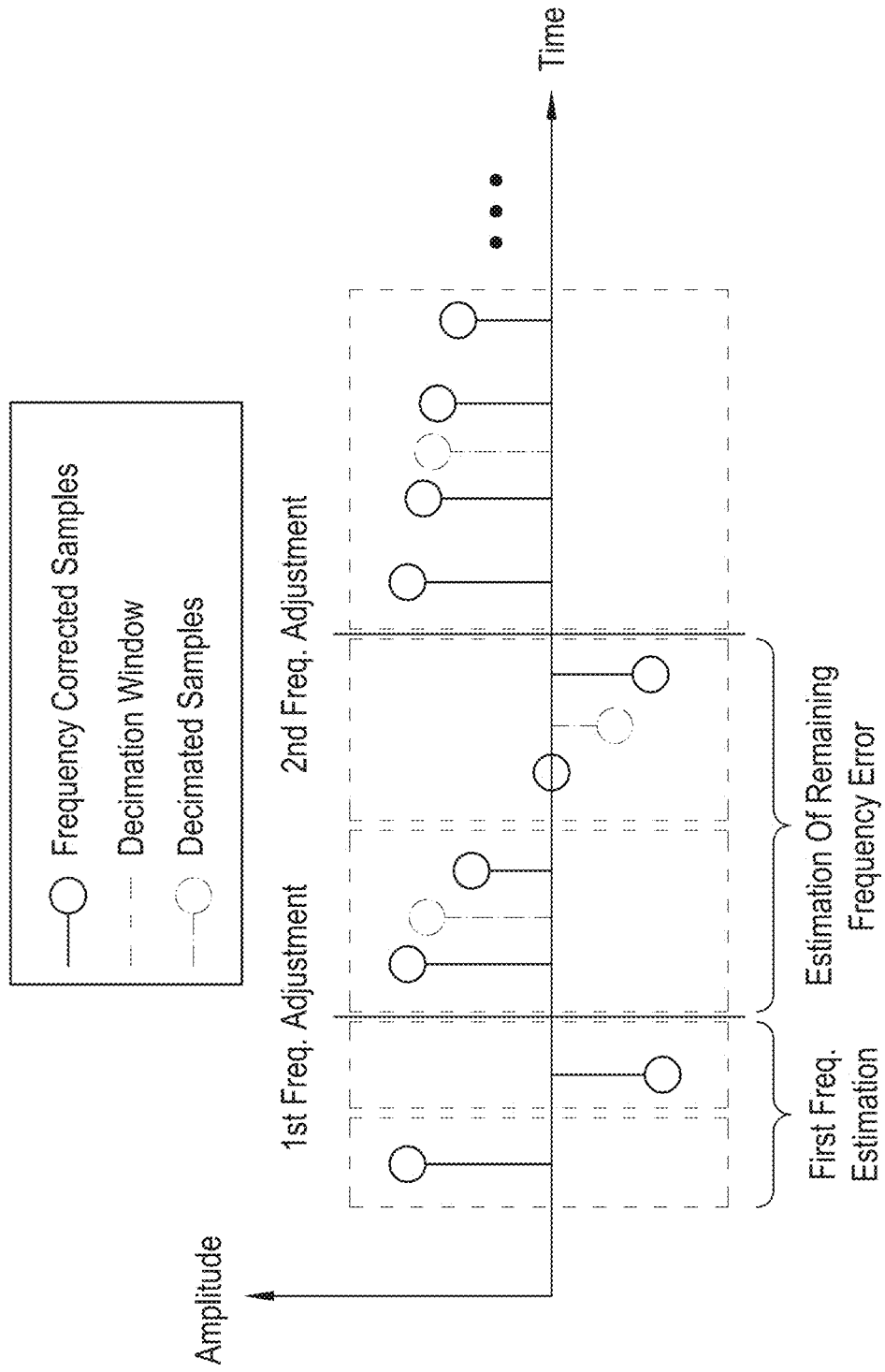
FIG. 6A illustrates a successive frequency approximation algorithm configured to increase decimation after every two output samples of the decimator.

With reference to FIG. 6A, a step-wise description of the algorithm includes:
1. Set decimation factor to 1 (no decimation) and reset frequency estimate to 0;
2. Correct symbol-phase based on the current frequency estimate and integrate corrected symbols for the given length defined by the current decimation factor;
3. Estimate phase difference between the current and last sample from the decimator output;

4. Calculate phase difference divided by the decimation factor and add it to the frequency estimate; and
5. If maximum decimation factor is reached, the algorithm has finished, if not then double decimation factor and repeat from step 2.

As described, the algorithm uses two samples (i.e., the estimation period is twice the decimation period) with the same decimation length to estimate the frequency and does not re-use the symbol energy from the previous decimation steps. This may be avoided if the decimator only produces one sample with a certain integration period and directly proceeds to the longer decimation time afterwards. Since the frequency estimate is also changed between the samples used for the phase discriminator, the phase of one of the decimator output samples needs to be adjusted.

FIG. 6B illustrates an example (i.e., a noise-less example) how this can be done. In the present example, Φ[n] defines the phase of the $n^{th}$ decimator output sample and corresponds to the corrected carrier phase in the center of the integration period. Correction of the carrier phase is done with the frequency estimate f[n−1] from the last estimation period. In a simplified power of two calculation of the remaining frequency error df[n], an estimation of the phase at the beginning of the last decimation period $\Phi_{pre}$[n−1] is performed.

Equation 3 provides an example of how an algorithm requiring two samples, where the estimation period is twice the decimation period, may be avoided if the decimator only produces one sample with a certain integration period and directly proceeds to a longer decimation time afterwards. Since the frequency estimate is changed between the samples used for the phase discriminator, the phase of one of the decimator output samples needs to be adjusted. As illustrated, the $\Phi_{[N]}$ defines the phase of the $n^{th}$ decimator output sample and is corresponding to the corrected carrier phase in the center of the integration period. Correction of the carrier phase was done with the frequency estimate f[n−1] form the last estimation period. For a more simplified calculation (i.e., power of two) of the remaining frequency error df[n], it is beneficial to estimate the phase at the beginning of the last decimation period $\Phi_{pre}$[n−1].

Accordingly, if it is assumed that the mixer, in order to correct the estimated frequency offset, resets to an initial phase of 0 at the beginning of every decimation period, the $\Phi_{pre}$[n−1] may be calculated with following recursive formula:

$$\Phi_{pre}[n-1] = \Phi[n-1] - \frac{\Phi[n-1] - \Phi_{pre}[n-2]}{2} + f_{est}[n-1] \cdot 2^{n-1} \quad [\text{Eq. 3}]$$

The term $$\frac{\Phi[n-1] - \Phi_{pre}[n-2]}{2}$$

considers the remaining frequency error df[n−1] of the last decimation period to rotate to the beginning of the symbol. The term $f_{est}$[n−1]·$2^{n-1}$ considers that the mixer always starts with phase 0 at the beginning of each decimation period, and rotates the phase to the expected carrier phase at the beginning of the next decimation period.

When n is 0 (no decimation), $\Phi_{pre}$[−1] will simply directly use the phase of the previous symbol Φ[−1]. Thus the algorithm starts as a normal phase discriminator out of two samples.

The algorithm, as described, utilizes memory to store the current decimator accumulator, the phase at the beginning of the last decimator period $\Phi_{pre}$[n−1], the last frequency estimate f[n−1] and a counter for the number of integrated symbols. For DSSS-like systems this needs to be stored for all possible down-sampling phases at the correlator output which is equal to the number of samples per symbol ($N_{sps}$). This causes a memory size of O($N_{sps}$) which is the same as a non-coherent algorithms which simply accumulates the amplitude of each possible down-sampling position. Furthermore, for higher $N_{sps}$, only the memory size increases as only one downsampled phase is processed per sample and thus the processing effort remain the same.

Figure 9:
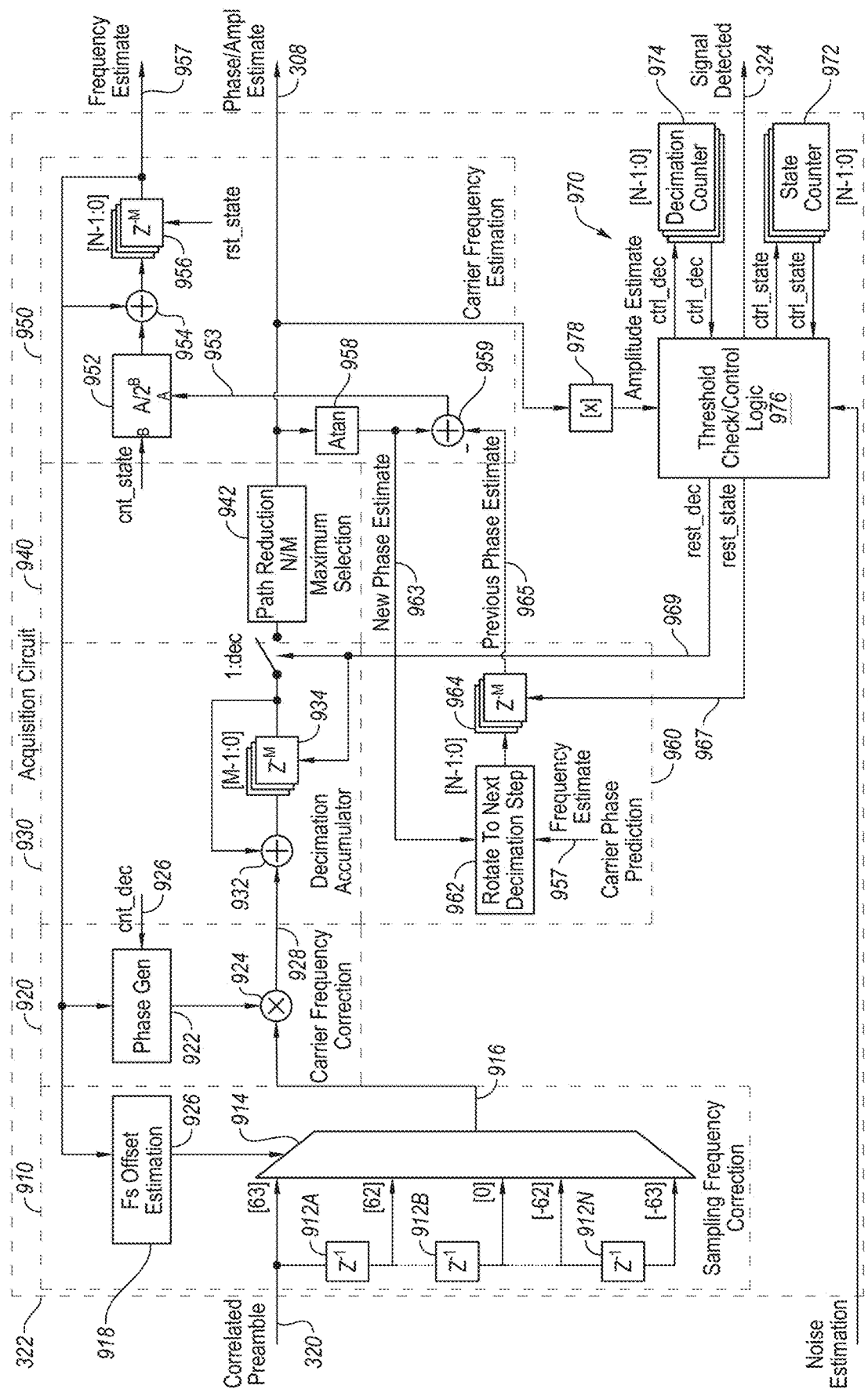
FIG. 9 illustrates an example implementation of the overall algorithm of the acquisition circuit of in the reconfigurable receiver.

FIG. 9 illustrates an example implementation of the complete algorithm used inside the acquisition circuit 322 of, for example, an IR-UWB receiver, such as the reconfigurable receiver 300 of FIG. 3. The acquisition circuit 322 includes a sampling frequency correction circuit 910 (since also timing may drift during long integration), a carrier frequency correction circuit 920, a decimation accumulator circuit 930 a maximum selection circuit 940, a carrier frequency estimation circuit 950, a carrier phase prediction circuit 960, and threshold control logic 970.

The sampling frequency correction circuit 910 receives the correlated data 320 and selects the corresponding sample out of a delay-line to adjust for the timing drift during integration on the data based on the carrier frequency estimate 957 as scaled to the sampling frequency. The delay elements 912 provide delays for the sample, for example by one delay cycle. The mux 914 selects a sample with the delay required to compensate for the timing drift. An offset estimation circuit 918 scales the carrier frequency estimate 957 to the sampling frequency. For example, if a 1 MHz offset at 10 GHz nominal carrier frequency is measured, then a 100 kHz offset for a 1 GHz sampling frequency is chosen assuming the carrier and sampling frequencies are derived from the same clock inside the transmitter and the receiver.

The carrier frequency correction circuit 920 uses the frequency estimate 957 to correct frequency before coherent integration at the decimation accumulator 932. The signal 916 represents the timing-drift compensated samples from the sampling frequency correction circuit 910. The phase generator 922 calculates the phase drift over time (cumulative integration of frequency estimate 957. The mixer 924 corrects the frequency before coherent integration. The control signal 926 provides the current integration time in symbols to calculate the phase drift. The carrier frequency correction signal 928 is the frequency corrected output. With an ideal frequency estimate, this output would stay constant in phase.

The maximum selection circuit 940 couples to the decimation accumulator circuit 930 and may be used to reduce the number of further processed down-sampled phase estimates by selecting the maximum out of N/M neighboring paths. The maximum selection circuit 940 includes a path reduction circuit 942 to provide only the "winner path" 944 for further processing.

The carrier frequency estimation circuit 960 couples to the maximum selection circuit 940. The carrier phase prediction circuit 960 also couples to the carrier frequency estimation circuit 950 and provides the phase reference to calculate the remaining frequency error in circuit 959. The carrier phase prediction circuit 960 includes the calculation element 962 to calculate Equation 3, and circuit 964 to store the frequency error for the next decimation and frequency refinement period. Furthermore circuit 964 receives a reset signal 967 at every reset of the algorithm (i.e., restart with decimation 0). This reset is generated independently for each path and generated whenever the threshold check 976 decides that the observed path is below a certain detection threshold.

The threshold control logic 970 includes a state counter 972, a decimation counter 974, control logic 976, and an absolute value circuit 978. The control logic 976 control state and decrement signals as well as reset state signal 967 and decrement signal 969, and further generates the signal found/detected signal 324 in case a certain detection threshold has been exceeded after at the last decimation step of the algorithm.

Figure 10:
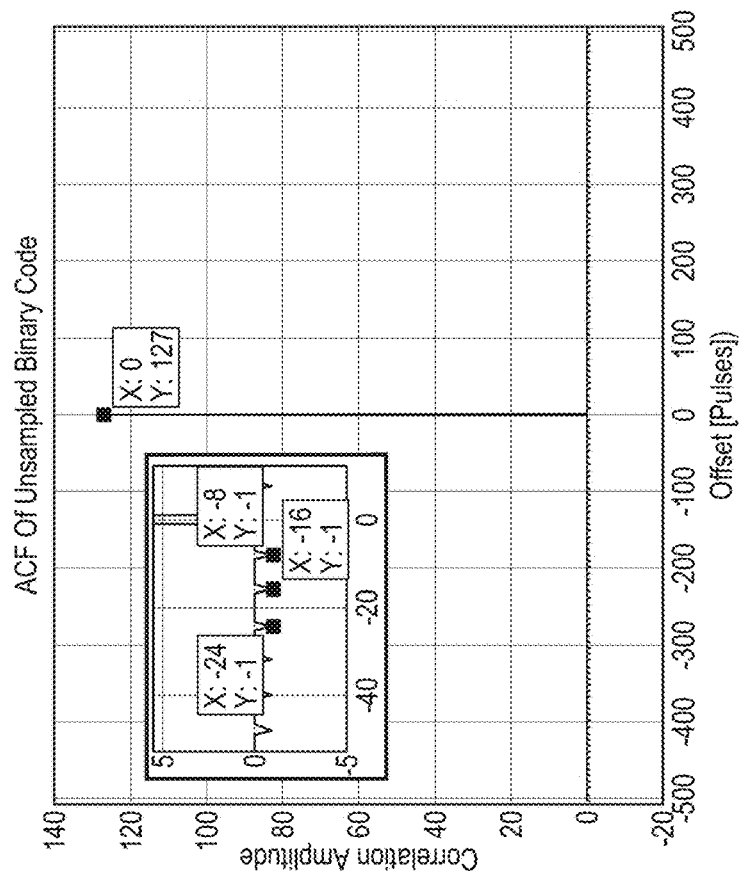
FIG. 10 illustrates a periodic autocorrelation function of an M-sequence and upsampled M-sequence.
Figure 10:
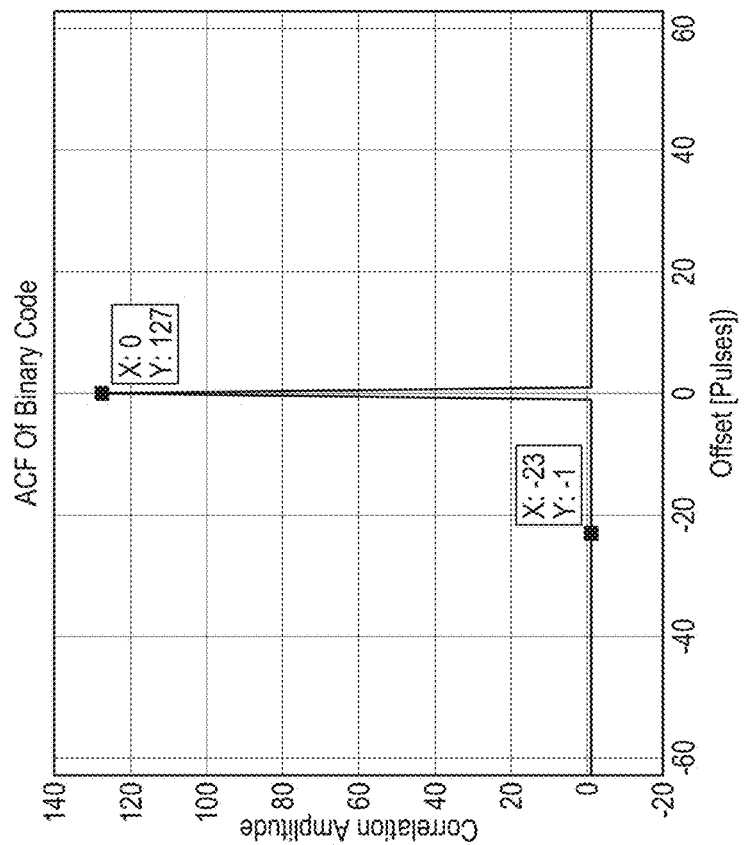

FIG. 10 illustrates a periodic autocorrelation function of an M-sequence and upsampled M-sequence. In operation, a first order channel estimate is derived in the symbol binning unit 334. The binary M-sequence are attractive due to their low peak-to-average power ratio (PAPR) compared to ternary Ipatov codes but suffer from side-lobes, as illustrated in FIG. 10, in the periodic autocorrelation function which can hide a weak first path if not taken care of separately. The present aspect solves this problem via calculation of mean value of the first order estimate in the binning unit at an offset, where no peaks of actual multipath-components are expected and consecutive subtraction of the mean value for all taps. Furthermore this mechanism can also be used for upsampled M-sequences by using independent mean values for each possible upsampling phase. For example, if the code is upsampled by a factor 4 (i.e., 3 zeros inserted between pulses), the code requires four independent calculations of the mean value for each of the 4 possible phases, as illustrated in FIG. 10.

Further, a securely spread system can be protected from brute-force attacks on the channel estimate which generate random side-lobes which standard deviation depend on the transmitted power of the attack, by using a threshold based on the noise estimate calculated from the cross-correlation result. Also, the noise threshold may be calculated from the binning unit result at an offset where no multi-path is expected. The calculation of the threshold, however, may also need to consider potential upsampling of the spreading code and thus the independent upsampling phases. Otherwise, an attacker could lower the threshold by simply transmitting random data with the same zero-insertion between the pulses. This would cause random cross-correlation peaks also with the same number of zeros between the peaks. Independent noise estimate for each phase, make sure there is no averaging over these zeros.

Figure 11:
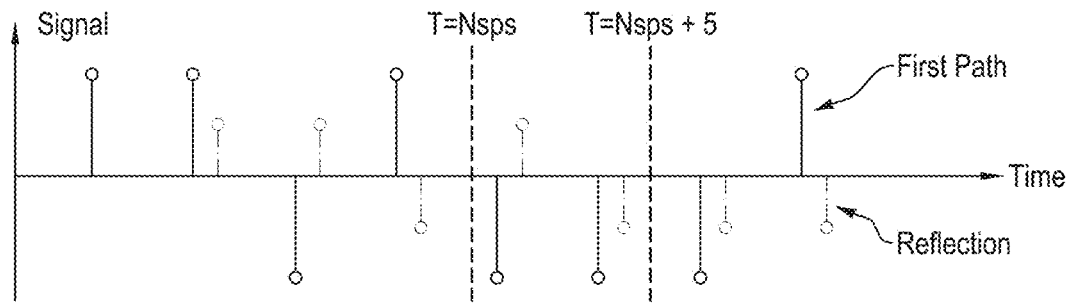
FIG. 11 illustrates the reconfiguration of the correlator coefficients for segmented reception.
Figure 11:
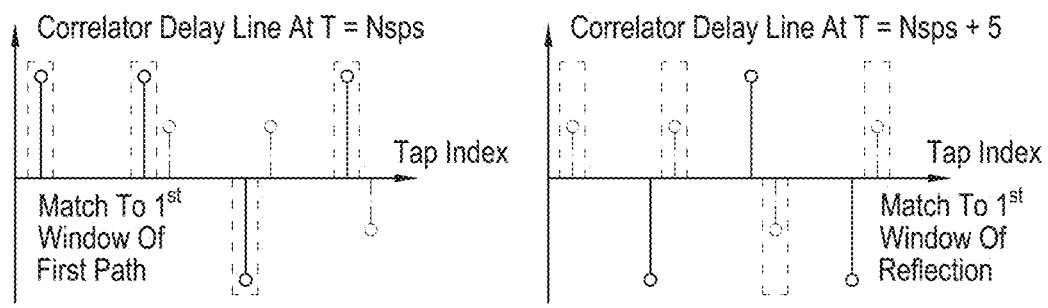
Figure 11:
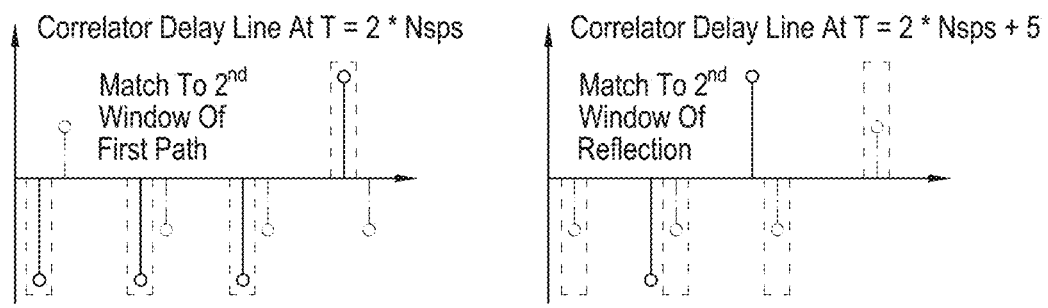

FIG. 11 illustrates an example of a segmented correlation used to correlate to symbols which are longer than the available correlator length. The principle is usable in the event coarse timing of the received signal is known during payload reception, for example. The symbol is therefore split into segments with length Nsps (Number of Samples per Segment) and the correlator coefficients are only provided for the current segment. After Nsps samples have passed, the coefficients need to be changed to the next segment. This opens a window of Nsps sample where multi-path components are correlated to the coefficients set for the current segment. Or in other words, the segmented correlation allows for a maximum delay spread of Nsps sampled between multi-path components. Further, reflections arriving outside the window are not correlated, since the coefficients have already been changed inside the correlator. Due to the split operation, the correlator produces several peaks at Nsps sample distance which energy may be combined before further processing. This may be done inside the rake receiver which includes an accumulator to sum-up several multi-path components and which may be re-used to sum-up the different segments.

Figure 12:
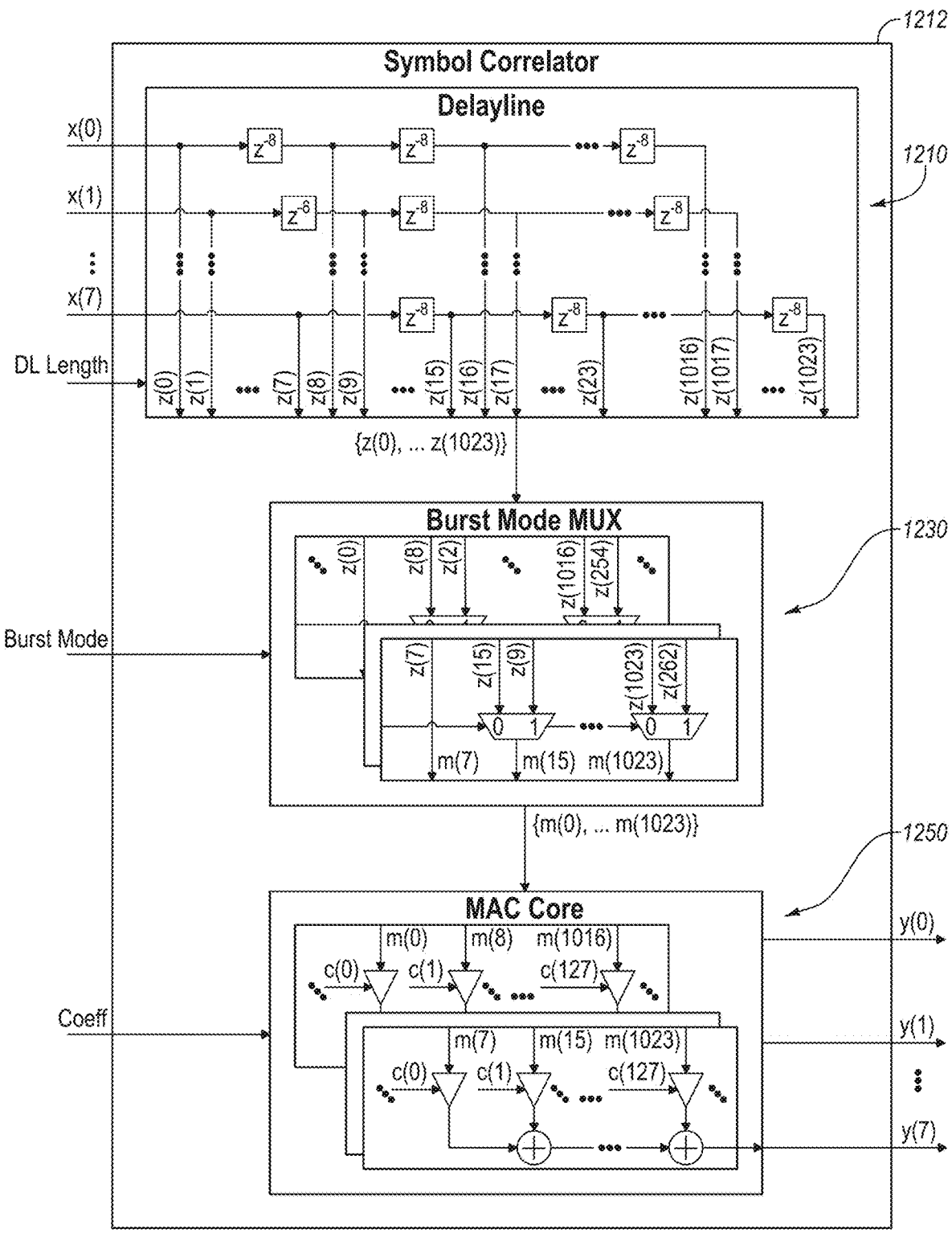
FIG. 12 illustrates a parallelized implementation example of the symbol correlator in the reconfigurable receiver.

FIG. 12 illustrates a symbol correlator 1212 which may correspond to correlator 212 of FIG. 2. As stated, the symbol correlator 1212 may be active in both the preamble and payload processes. The symbol correlator 1212 includes a delay line 1210, a burst mode multiplexer 1230, and a MAC core 1250. The example 1212 illustrates processing of eight samples at one clock cycle. Because in the used process node, the correlator cannot feasibly operate at a system clock frequency of, for example, 1 GHz, the correlator is instead operated at ⅛ of the sampling frequency which is the reason for processing 8 samples per clock cycle. Accordingly, the architecture operates, for example, with eight parallel processing paths.

Figure 7:
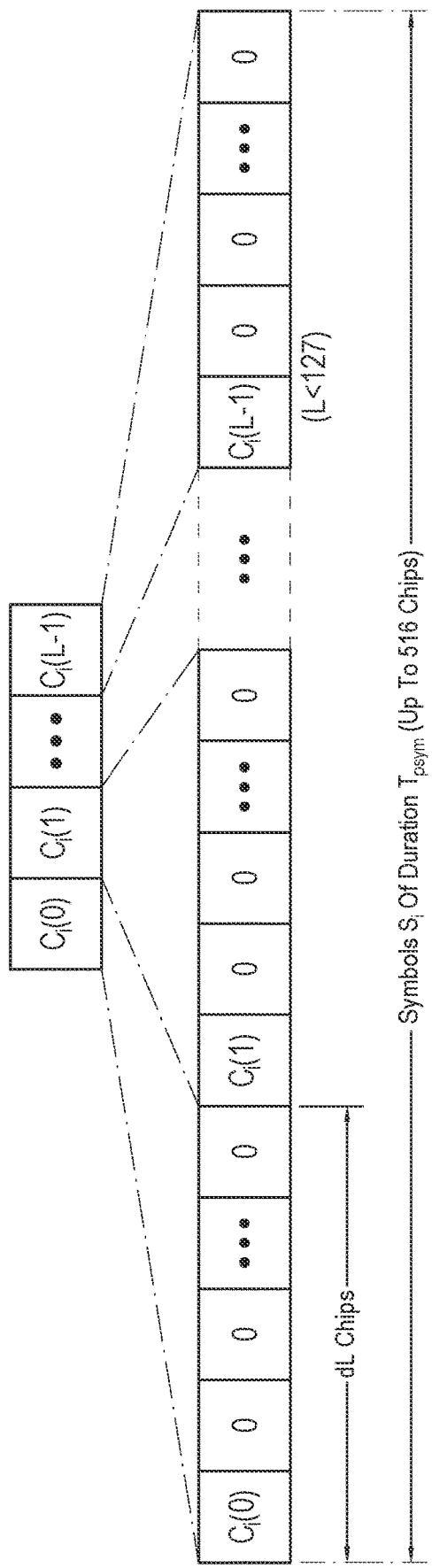
FIG. 7 illustrates a preamble symbol according to IEEE Standard 802.15.4.

A delay line 1210 provides delay elements for accumulating a history of the pulses or samples. In the present aspect, the elements of the delay line are multiplexed depending on whether the system is in the burst mode or in the payload mode. In principle, history is needed in every correlator implemented using a delay line. The elements of the delay line are multiplexed before they go into the multiplier/accumulator portion of the correlator, which then multiplies the samples with the coefficients of the spreading code, and then finally accumulates the samples. Accordingly, the delay line 1210 and the MAC core 1250 change the structure of the symbol. In the preamble symbol as seen in FIG. 7, there may be a pulse every eight samples which corresponds to one pulse followed by seven "0's", which is then followed by another sample.

Figure 8:
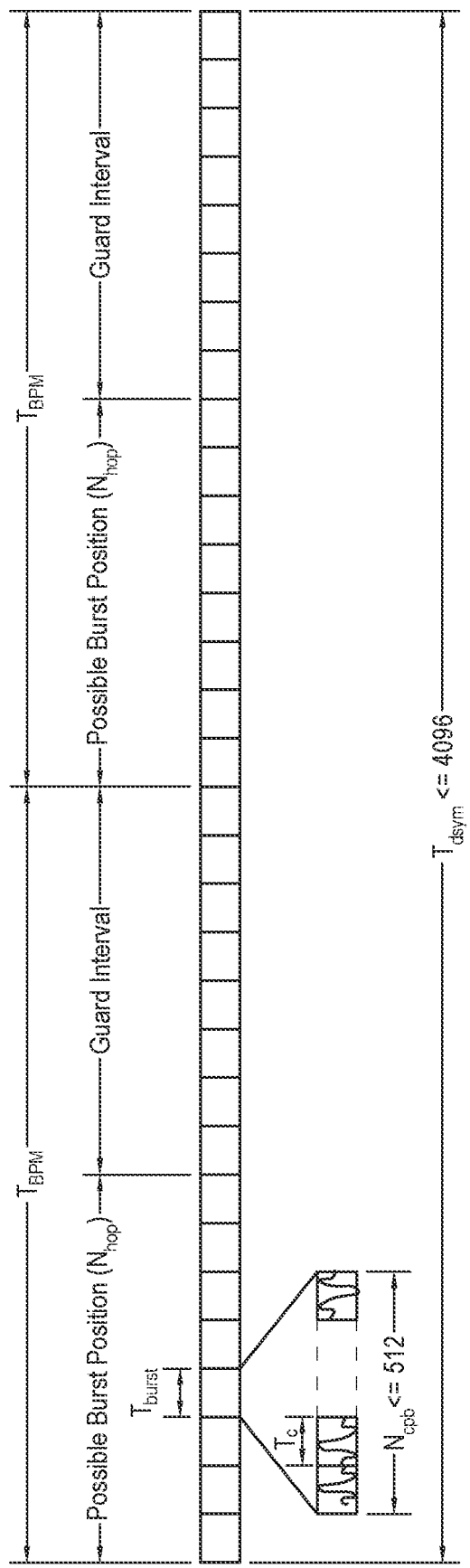
FIG. 8 illustrates a payload symbol according to IEEE Standard 802.15.4.

In the payload symbol of FIG. 8, there may be bursts which means there are pulses at every sample, without any gaps in between. However, to reuse the multipliers in the MAC core 1250 in both the payload process and the preamble process, the multiplexer 1230 must provide a different selection of pulses from the delay line. Accordingly in the preamble process, only one of every eight samples are feed into the MAC core 1250 because the preamble process includes one sample followed by seven "0's", which is followed by another pulse and seven "0's". Since the "0's" do not need to be fed into the MAC core 1250, they are not passed by the multiplexer 1230. However, in the burst process, there are no "0's" between the pulses therefore, all neighboring pulses are fed into the multipliers of the MAC core 1250 when the multiplexer 1230 selects different elements from the delay line.

Furthermore, the correlator structure 1212 allows reconfiguration of coefficients. This re-configuration can also be used to allow a segmented correlation of one symbol that exceeds to the size of the correlator. This avoids an increase in area and power in case of payload reception with longer symbols compared to the preamble. In case of the payload, the energy of the correlated segments can be combined inside the rake receiver 350 as it already collects the energy of several multipath.

FIG. 13 illustrates the active elements of the reconfigurable receiver 1300 configured as a payload receiver with support for segmented correlation. The payload re-uses the same correlator 312, the resampling circuit 316, the Rake module 350 and the timing and carrier phase tracking 332 as the preamble receiver. These elements and especially the correlator are usually the most area and power consuming parts of the DSSS-like receiver. Additional elements for payload reception may contain a coefficient generation unit 1302, to re-configure the correlator for different spreading codes between symbols or segments. The coefficient generation unit 1302 is triggered by the timing tracking unit 332 whenever a symbol or segment time period has passed and an update of the coefficients is required. The signal with the collected energy of several multi-path components is then fed into a demodulation module 352 (e.g. BPM-BPSK in case of HRP-UWB in IEEE 802.15.4) which re-constructs the modulation signal used by the transmitter. This demodulated data may be fed in inner decoding module (e.g. Viterbi) to perform a first level decoding of the demodulated data. The data from the inner decoder may be fed into an outer decoders 1356 and 1358 (e.g. SECDED and Reed Solomon in case of HRP-UWB in IEEE 802.15.4).

The payload receiver re-uses the main parts of the preamble receiver with an addition of decoding elements, outer decoders 1356 and 1358, specific for the physical layer (in this example HRP IR-UWB according to IEEE 802.15.4) and a coefficient generation unit 1302 to re-configure the coefficients of the symbol correlator 312. In addition, HRP IR-UWB changes the symbol structure to a burst-based structure. Also, this is solved in the present embodiment via multiplexing of the input to the MAC core 1250 of the correlator 312. An example illustrating the segmented correlation of a symbol can be seen in FIG. 11.

Figure 14:
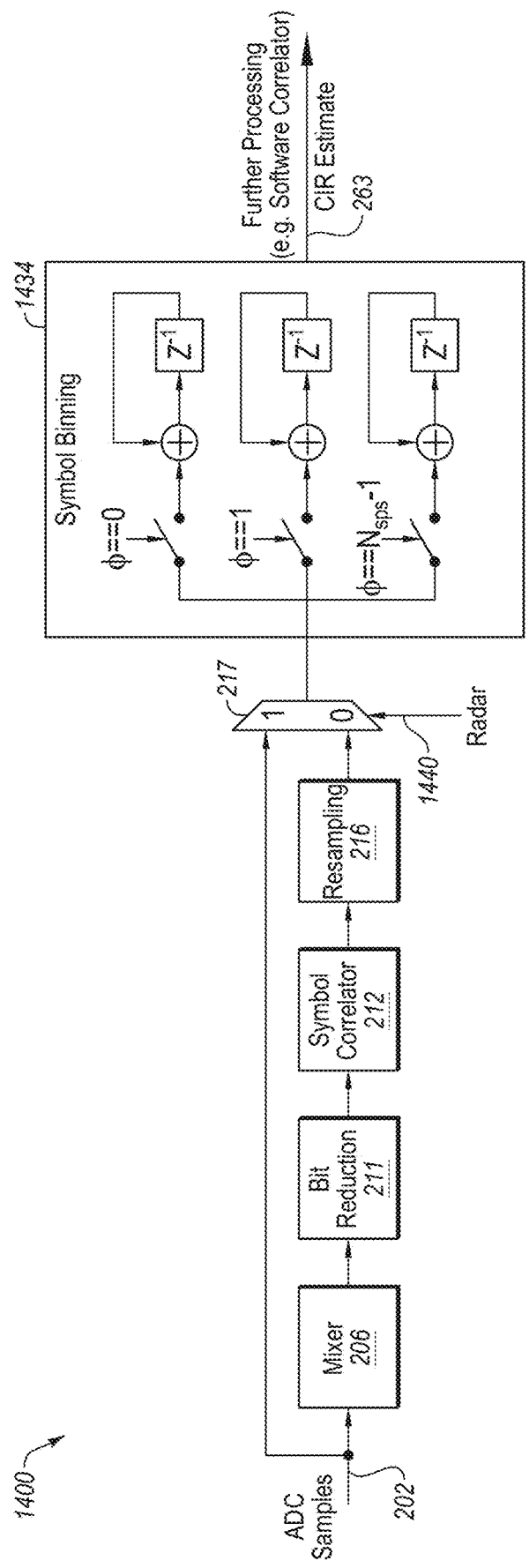
FIG. 14 illustrates the active elements of the reconfigurable receiver configured for radar operation.

FIG. 14 illustrates an embodiment of a reconfigurable receiver 1400 suitable for single antenna radar mode operation and full-duplex communication. In radar mode, the samples 202 bypass the mixer 206, the bit reduction circuit 211, and the symbol correlator 212 using a radar mode multiplexer 217, controlled by radar mode signal 1440 from processor 280. The samples 202 are directly provided to the binning unit 1434. One difference in the requirements during radar mode operation is that a very high receiver dynamic range is desired especially in a single antenna system configured without isolation between the receiver (RX) and the transmitter (TX). The full dynamic range may be used by an internal interfering path (i.e., a direct path) from the front-end transmitter circuit 122 to the front-end receiver circuit 121 with the necessary resolution of the ADC 130 determined by the available link budget for weaker reflections.

Although higher dynamic range is also desired for 2-way ranging operation, there are usually additional limits (e.g., phase noise) that may limit the available resolution. Normal payload reception does not provide substantial sensitivity improvement when using more than 3 bits, for example, in a BPSK modulated systems.

The embodiment of FIG. 14 provides an efficient solution to the contradicting requirements of ranging and radar modes without the need for different or redundant hardware. In the case of repeating symbols, the binning unit 1434 used for periodic integration of several preamble symbols as described with respect to FIG. 3 may be used to directly periodically integrate the ADC samples 202. In this embodiment, the higher ADC precision may be used in radar mode, with 2-way communication (e.g. ranging) using a lower precision symbol correlator to reduce power consumption of the real time correlation required during 2-way communication. In radar mode operation, first several symbols are periodically integrated without correlation to the spreading code and then, only after integration is finished, does correlation begin in a post-processing step (e.g. in process performed by the processor 280. This process is further improved when the symbol correlator output and ADC use the same or similar bit-width.

It is noted that pulses are transmitted in both ranging mode and radar modes. However in ranging mode, the distance is determined by using transmissions from two device with each transmitting device relying on its own non-synchronized clock sources, resulting in significant processing effort to synchronize the signals which requires a mixer 206 to continuously rotate the carrier phase as mentioned above, for example. Another primary difference is that in normal ranging mode, the dynamic range does not need to be as high because the system is not jamming the system's receiver by the transmissions from the system's transmitter, described herein as the internal interfering path, hence the need for utilizing the bit reduction circuit 311 prior to the correlator 312 before the symbols are integrated.

In radar mode, there is no need to synchronize and clocks since the received signal is a reflection of the transmitted signal of the same device which typically shares clock generation (i.e., a shared local oscillator (LO)) between the front-end receiver circuit 121 and the front-end transmitter circuit 122, of FIG. 1. Accordingly, radar mode places different requirements on the reconfigurable receiver. In the case of radar mode, higher precision or higher dynamic range addresses the interference from the system's transmitter which may result in the option of bypassing of the bit reduction circuit 211.

As in ranging, the symbol binning unit 1434 accumulates each downsampling phase of the symbol separately. The pattern (i.e., template) chosen for the correlator has impulse-like output correlation properties which means that after correlating to the incoming sequence, a single pulse is generated at the output of the correlator, with the position of the pulse changing depending on the delay of the signal. Because the symbol is sent in a repeating fashion, for example every microsecond, the same symbol is sent again which means the window is as long as the symbol period and the positions inside the window are referred to downsampling phases.

To find all possible multipath components which are arriving at different delays, each one needs to be accumulated separately, which is illustrated by the binning unit 1434 with different down-sampling phases, corresponding to different points in time with the samples of the symbol correlator being fed into an accumulator. In case of ranging mode operation, the process directly results in a first order estimate of the channel impulse response.

Further, the radar mode operation does not require synchronization to another device so the mixer 206 may be bypassed. Also, there is no need for symbol correlation in a hardware correlator, such as correlator 212, because it is also possible to accumulate several symbols in the symbol binning unit 1434 without using up-front correlation. Since the operation of receiving is linear, it is possible to first accumulate or first correlate. In the radar mode, the correlator, which is a high power consuming device, may be bypassed before the symbol binning unit 1434. The correlation in radar mode may be performed afterward by the software correlator 1450 (i.e., further processing) operating in the processor 280 of FIG. 2. Accordingly, because of the higher precision required during radar mode, the hardware symbol correlator 212 does not need to be scaled-up for higher resolution which would result in a significant increase to the integrated circuit area and power.

Figure 15:
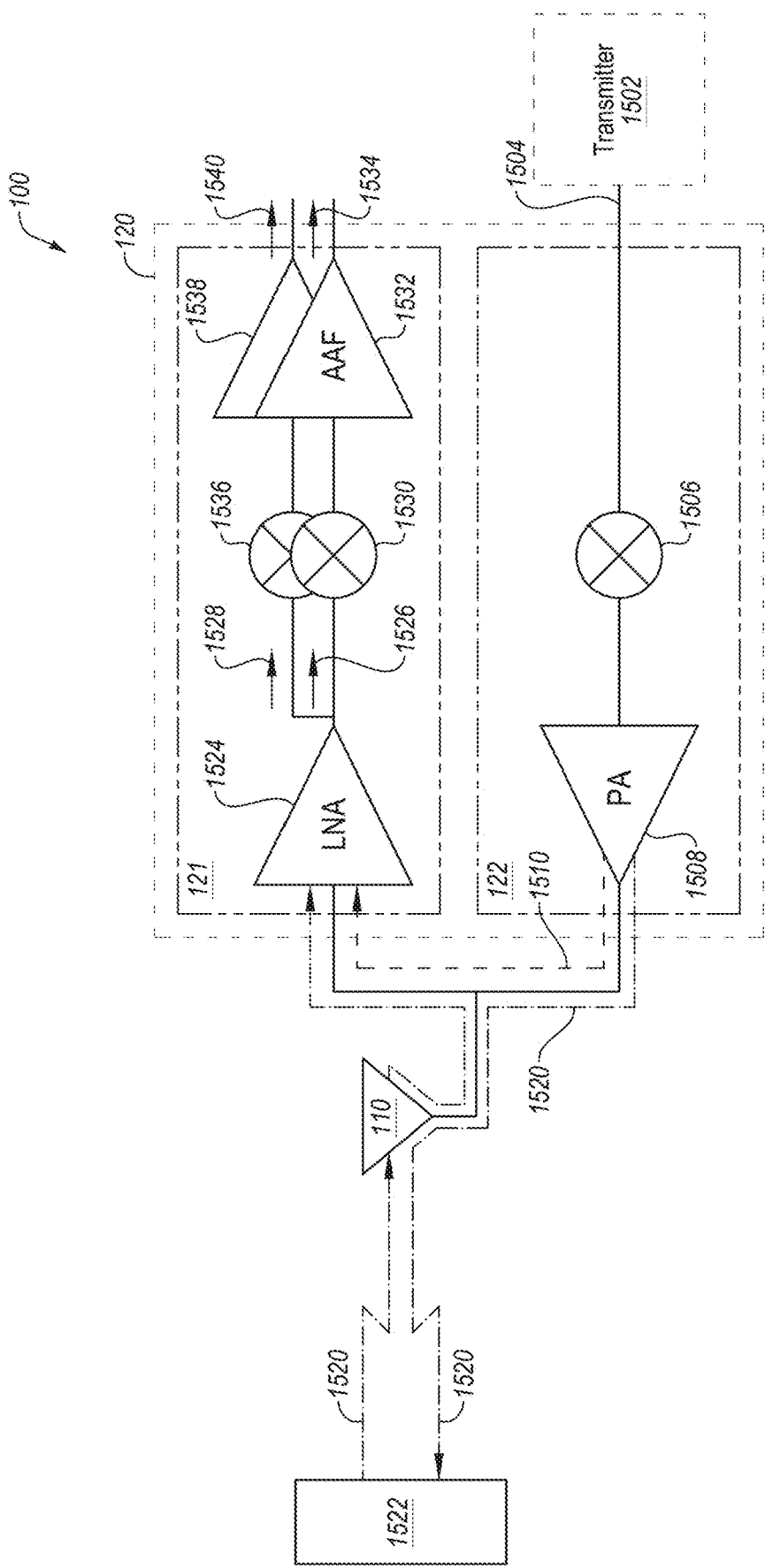
FIG. 15 illustrates a block diagram of an interference scenario for a reconfigurable receiver configured for radar operation.

FIG. 15 illustrates a block diagram of an interference scenario for an RF communication device 100 including the reconfigurable receiver 1400 (FIG. 14) configured for radar mode operation. In an RF communication device 100 where the reconfigurable receiver 200 is configured to operation in radar mode, internal transmit interference may occur. The internal transmit interference is illustrated within front-end circuit 120 where a transmitter 1502 generates an intermediate frequency (IF) transmit signal or a transmit baseband (BB) signal 1504 for direct conversion transceivers. For illustrative purposes, the transmit signal 1504 in radar mode is illustrated as taking two paths, namely a direct, jamming, or interfering internal path 1510 and a reflected path 1520. The transmit signal 1504 passes into the front-end transmit circuit 122 and then passes through an upconverter mixer 1506 and a power amplifier (PA) 1508. The power amplifier 1508 substantially increases the signal level (i.e., power) of the upconverted transmit signal resulting in the generation of the two transmit signal paths, namely the interfering internal path 1510 and the desired reflected path 1520.

The reflected path 1520 is transmitted by the antenna 110 out to an object 1522 which in turn reflects the transmitted signal back to the antenna 110. The transmit signal is then received back at the antenna 110 at a substantially attenuated signal (power) level and passes through the front-end receiver circuit 121 including a low-noise amplifier (LNA) 1524 and is then split into an in-phase signal 1526 and a quadrature signal 1528. The in-phase signal 1526 is then downconverted by an in-phase mixer 1530 and processed by an anti-aliasing filter circuit 1532 to generate an in-phase baseband signal 1534 for further processing by an ADC 130. Similarly, the quadrature signal 1528 is also downconverted by a quadrature mixer 1536 and processed by an anti-aliasing filter circuit 1538 to generate a quadrature baseband signal 1540 for further processing by an ADC 130.

While a receive circuit could process the baseband signals, the transmitted signal on the interfering internal path 1510 can effectively "jam" the front-end receiver circuit 121 based on the high power of the transmit signal on the interfering internal path 1510. Accordingly, an embodiment provides a circuit and method for mitigating the effects of the transmit signal coupling through the interfering internal path 1510 to the reflected signal received over the reflected path 1520 at the front-end receive circuit 121.

Figure 16A:
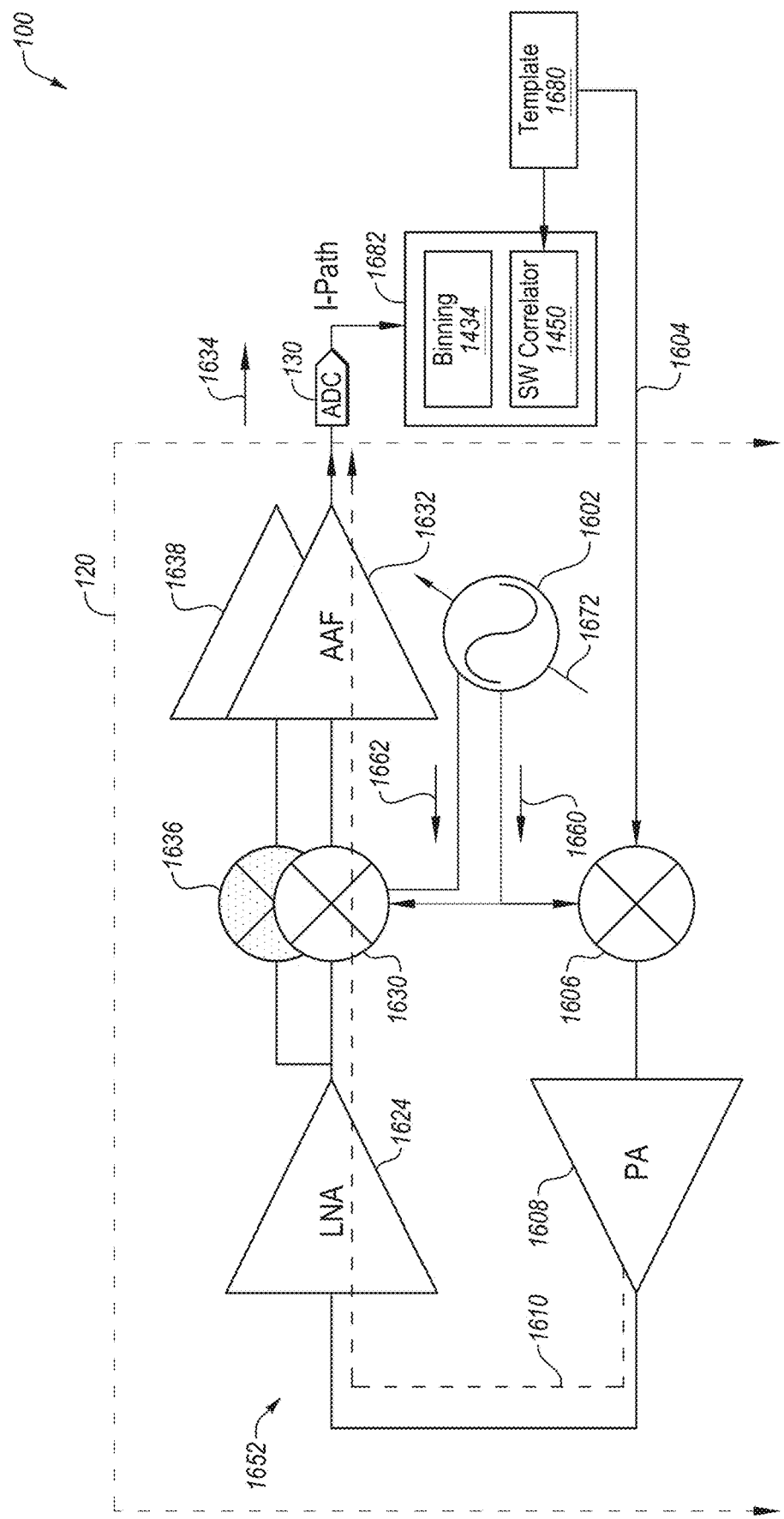
FIG. 16A illustrates a block diagram of calibration configuration for compensating for mitigating in-phase interference from an internal transmit signal path.
Figure 16B:
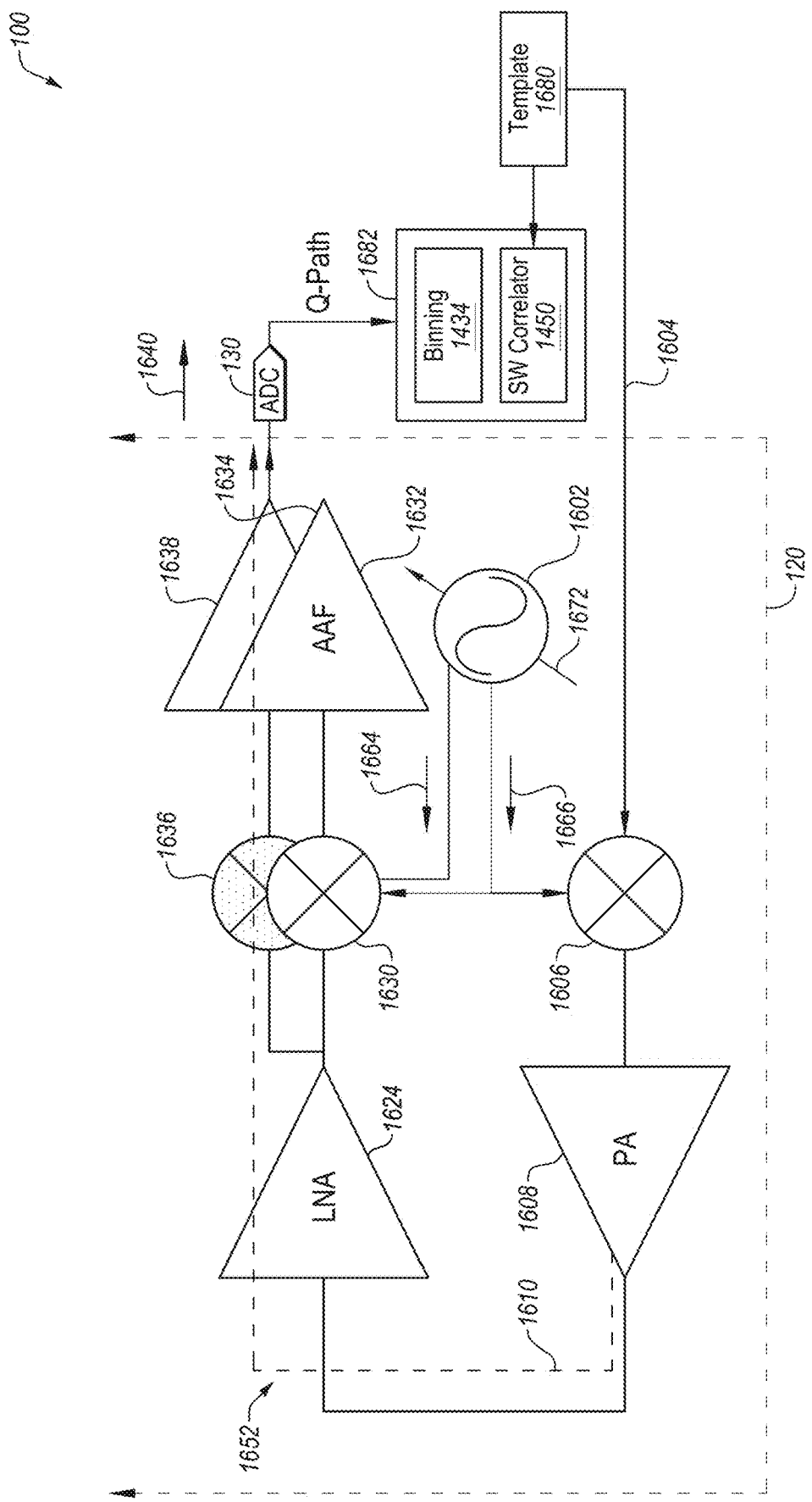
FIG. 16B illustrates a block diagram of calibration configuration for compensating for mitigating quadrature interference from an internal transmit signal path.

FIG. 16A and FIG. 16B illustrate a block diagram of a calibration configuration to mitigate interference from the transmit signal on the internal transmit signal path 1510. Generally, the RF communication device 100 of FIG. 16A and FIG. 16B utilize frequency adjustments to a local oscillator 1602 for upconverting and downconverting a transmitted signal 1604. The frequency adjustments to the local oscillator signal, as controlled by the processor 280, allow each of the in-phase path 1650 (illustrated as in-phase calibration configuration 1650) and the quadrature path 1652 (illustrated as quadrature calibration configuration 1652) to be individually calibrated to respectively identify respective LO frequencies 1671, 1673 (FIG. 2) that result in a minimization of the in-phase and quadrature amplitude of the interfering TX path. The LO frequencies 1671 and 1673 associated with minimized amplitude of the in-phase and quadrature components of the interfering TX path are then sequentially applied to identify a target 1522. The specific configurations for calibration and target identification will be discussed with reference to the process of FIG. 17 and the circuit configuration of FIG. 16.

Figure 17:
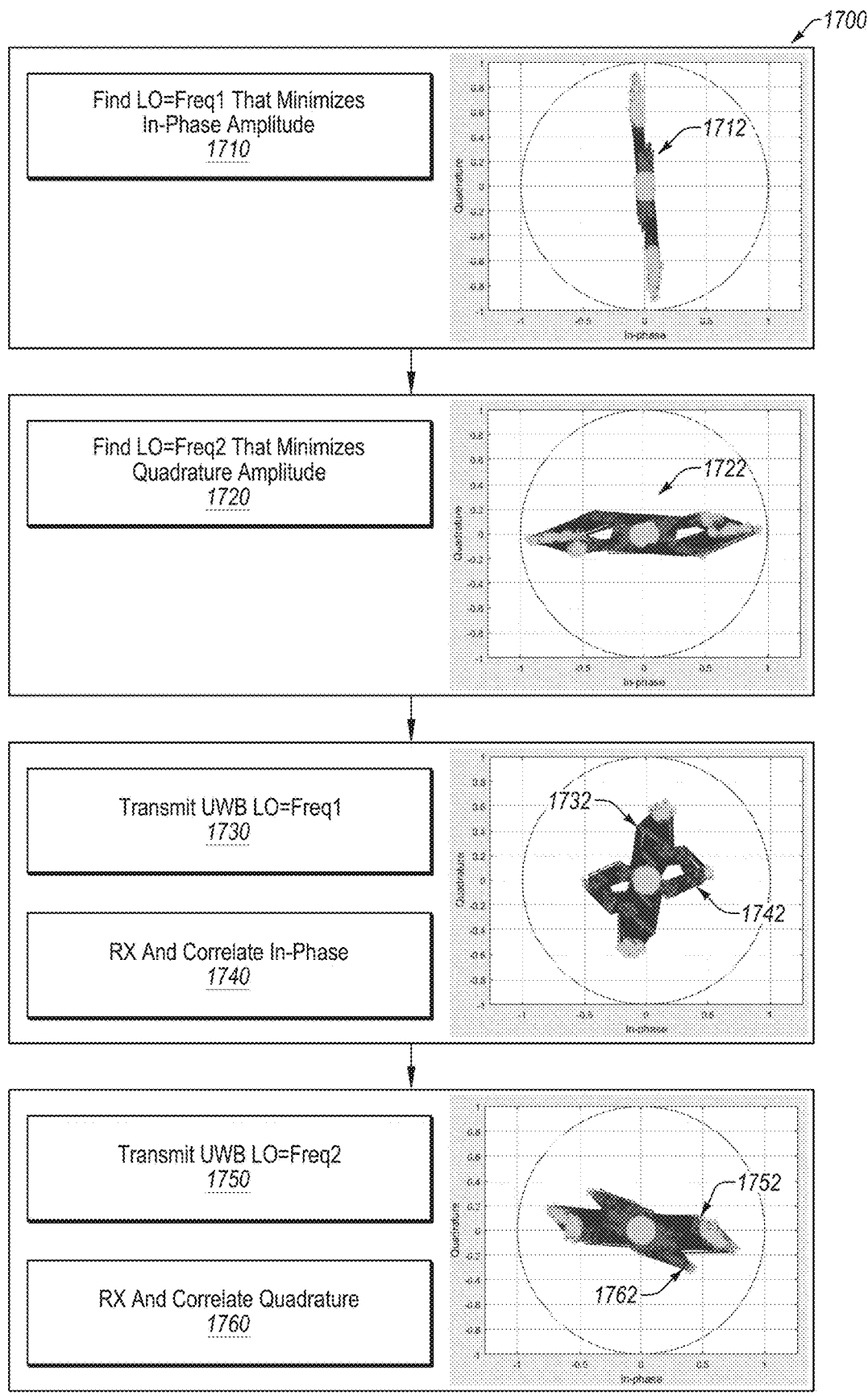
FIG. 17 illustrates a method for detecting a radar signal using the mitigation configuration of FIG. 16.

FIG. 17 illustrates possible results of the internal interfering transmit signal mitigation configuration of FIG. 16. The first found frequency minimizes the amplitude of the interfering TX signal at the output of the in-phase mixer. Thus the in-phase path is free of self-interference and maximizes the sensitivity to a reflection arriving in-phase. The second frequency minimizes the amplitude of the interfering TX signal at the output of the quadrature mixer. Thus with this configuration, the quadrature path is free of self-interference and maximizes sensitivity to a reflection arriving in quadrature phase. The required frequencies depends on the internal group delay between TX and RX mixer. A radar mode method 1700 includes calibration steps for identifying an in-phase local oscillator frequency 1671 and a quadrature local oscillator frequency 1673 associated minimum amplitude of the in-phase and quadrature signals. The identified (calibrated) local oscillator frequencies 1671 and 1673 are then sequentially applied to a reflected signal to identify a target in the presence of an undesirable high-power internal transmit signal received over the internal interfering path 1610.

In a step 1710, a first or in-phase minimum amplitude LO frequency 1671 is identified based on a minimization of the in-phase amplitude, as illustrated in plot 1712, of a received transmit signal on the internal interfering path 1610. The first or in-phase minimum amplitude LO frequency 1671 may be determined by iterative adjustments to the LO frequency by the processor 280 via control signal 1670 followed by measurements or analysis of the in-phase amplitude. Once a minimized in-phase amplitude is determined, the frequency may be stored in processor 280 as the first or in-phase minimum amplitude LO frequency 1671.

To determine the first or in-phase minimum amplitude LO frequency 1671, the RF communication device 100 is configured as illustrated in configuration 1650 of FIG. 16. In configuration 1650, a transmit signal 1604 is generated based on a correlation template 1680. For example this template can consist of repeat symbols as shown previously in FIG. 7. The local oscillator 1602 is further set by the control signal 1670 to an initial LO frequency as retrieved from and controlled by, for example, processor 280 of FIG. 2. The transmit signal 1604 is up-converted by mixer 1606, amplified by power amplifier 1608, received by low noise amplifier (LNA) 1624, and downconverted by in-phase mixer 1630 operating based on the initial and subsequently varying in-phase LO frequency signal 1660. The downconverted in-phase signal is then processed by an anti-aliasing filter (AAF) 1632 with the output in-phase signal 1634 being digitized by ADC 130 and binned and correlated by a binning unit and software correlator module 1682, re-using, for example, the above described binning unit 334 and software correlator in processor 280. The processor 280 may then determine and store the in-phase amplitude based on the initial LO frequency 1671.

Since the process of step 1710 identifies the LO frequency 1671 associated with generating a minimum in-phase amplitude, the in-phase path is free of self-interference and can be used with maximum gain and sensitivity to detect reflections.

In a step 1720, a second or quadrature minimum amplitude LO frequency 1673 is identified based on a minimization of the quadrature amplitude, as illustrated in plot 1722, of a received transmit signal on the internal interfering path 1610. The second or quadrature minimum amplitude LO frequency 1673 may be determined by iterative adjustments to the LO frequency by the processor 280 via control signal 1672 followed by measurements or analysis of the quadrature amplitude. Once a minimized quadrature amplitude is determined, the frequency may be stored in processor 280 as the second or quadrature minimum amplitude LO frequency 1673.

To determine the second or quadrature minimum amplitude LO frequency 1673, the RF communication device 100 is configured as illustrated in configuration 1652 of FIG. 16B. In configuration 1652, a transmit signal 1604 is generated based on a correlation template 1680. The local oscillator 1602 is further set by the control signal 1672 to an initial LO frequency as retrieved from and controlled by, for example, processor 280 of FIG. 2. The transmit signal 1604 is up-converted by mixer 1606, amplified by power amplifier 1608, received by low noise amplifier (LNA) 1624, and downconverted by quadrature mixer 1636 operating based on the initial and subsequently varying quadrature LO frequency signal 1664. The downconverted quadrature signal is then processed by an anti-aliasing filter (AAF) 1638 with the output quadrature signal 1640 being digitized by ADC 130 and binned and correlated by a binning unit and software correlator module 1682, re-using for example, the above described binning unit 334 and software correlator in processor 280. The processor 280 may then determine and store the quadrature amplitude based on the initial LO frequency 1673.

Since the process of step 1720 identifies the LO frequency 1673 associated with generating a minimum quadrature amplitude, the quadrature-phase path is now free of self-interference and can be used with maximum gain and sensitivity to detect reflections.

Once the first or in-phase minimum amplitude LO frequency (freq1) 1671 and the second or quadrature minimum amplitude LO frequency (freq2) 1673 have been identified (i.e., calibration of the radar configuration of the reconfigurable receiver), the frequencies 1671 and 1673 may be stored in processor 280 for future use in target identification. The identification of the calibration frequencies may be performed in a manufacturing environment or in a deployment scenario. Further, the identification of the frequencies may be performed once or periodically over the operation of the RF communication device 100. Once the frequencies 1671 and 1673 are identified and stored for configuring the LOs 1606, 1630, and 1636, then the RF communication device 100 may perform target identification in the radar configuration.

A step 1730 includes configuring the respective LOs 1606, 1630, and 1636 with the first or in-phase minimum amplitude LO frequency (freq1) 1671 and transmitting the transmit signal 1504 from the transmitter 1502, as described above with respect to FIG. 15. The transmission of the transmit signal 1504 will generate both a received signal over the interfering internal path 1510 and a receive signal over the reflected path 1520. As described, configuring the LOs 1606, 1630, and 1636 with the first or in-phase minimum amplitude LO frequency (freq1) 1671 results in the minimization of the in-phase correlation of the received transmit signal on the internal interfering path 1510 as illustrated in plot 1732, which is corresponds to the plot 1712 generated in step 1710.

In a step 1740, the transmit signal received back from the target 1522 over the reflected path 1520 is received and the in-phase signal is correlated resulting in an in-phase plot of a received signal having a group delay different, as illustrated in plot 1742, from the group delay on the internal interfering path 1510. Accordingly, the plot 1742 identifies the presence of the target 1522 in the interference free in-phase receive path. A target 1522 arriving in quadrature phase may be further confirmed by additionally processing the received signal using the received quadrature signal.

A step 1750 includes configuring the respective LOs 1606, 1630, and 1636 with the second or quadrature minimum amplitude LO frequency (freq2) 1673 and transmitting the transmit signal 1504 from the transmitter 1502, as described above with respect to FIG. 15. The transmission of the transmit signal 1504 will generate both a received signal over the interfering internal path 1510 and a received signal over the reflected path 1520. As described, configuring the LOs 1606, 1630, and 1636 with the second or quadrature minimum amplitude LO frequency (freq2) 1673 results in the minimization of the quadrature correlation of the a received transmit signal on the internal interfering path 1510 as illustrated in plot 1752, which is corresponds to the plot 1722 generated in step 1720.

In a step 1760, the transmit signal received back from the target 1522 over the reflected path 1520 is received and the signal is correlated resulting in an quadrature plot of a received signal whereas the reflecting signal shows a different phase, as illustrated in plot 1762, from the in-phase on the internal interfering path 1510. Accordingly, the plot 1762 identifies the presence of the target 1522. The target 1522 may be further or alternatively confirmed by processing the received signal using either or both of the received in-phase or quadrature signals.

While the principles of the invention have been described above in connection with specific apparatus, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A reconfigurable receiver, comprising:
a mixer configured to mix digital samples with a carrier phase estimate signal and generate mixed digital samples based on the carrier phase estimate signal;
a symbol correlator configured to correlate the mixed digital samples and generate correlated data;
a symbol binning unit configured to bin the correlated data and generate a first order channel impulse response estimate; and
a multiplexer configured to switch the digital samples to the symbol binning unit when the reconfigurable receiver is configured in radar mode and to switch the correlated data to the symbol binning unit when the reconfigurable receiver is configured in a ranging mode.

2. The reconfigurable receiver of claim 1, further comprising a rake receiver configured to accumulate multipaths of the correlated data and generate a rake receiver output signal based on the first order channel impulse response estimate.

3. The reconfigurable receiver of claim 2, further comprising a timing and carrier phase tracking circuit configured to generate a carrier phase and symbol timing estimate based on the rake receiver output signal.

4. The reconfigurable receiver of claim 3, further comprising a coherent acquisition circuit using a successive frequency approximation algorithm to generate a first frequency and phase estimate of correlated data used to generate a carrier phase and frequency estimate signal based on successive doubling of a decimation factor of the correlated data for a successive estimation period and refined frequency estimate of the correlated data.

5. The reconfigurable receiver of claim 4, wherein the timing and carrier phase tracking circuit is further configured to generate the carrier phase estimate for the mixer and the symbol timing estimate.

6. The reconfigurable receiver of claim 5, wherein the coherent acquisition circuit is further configured to perform sampling frequency correction within an integration period based on the carrier frequency estimate.

7. The reconfigurable receiver of claim 1, further comprising a resampling circuit coupled between the symbol correlator and the symbol binning unit, to correct for timing drifts affecting the first order channel impulse response estimate of the symbol binning unit.

8. The reconfigurable receiver of claim 1, further comprising a processor configured to correlate the first-order channel impulse response estimate when the reconfigurable receiver is in radar mode.

9. The reconfigurable receiver of claim 8, wherein the processor is further configured to identify an in-phase minimum amplitude local oscillator (LO) frequency based on minimizing an in-phase amplitude of a transmit signal traversing an internal interfering path in a communication device.

10. The reconfigurable receiver of claim 9, wherein the processor is further configured to distinguish between an in-phase received signal in a reflected path from a target and a quadrature received signal in the internal interfering path based on configuring local oscillators in the communication device with the in-phase minimum amplitude LO frequency.

11. The reconfigurable receiver of claim 8, wherein the processor is further configured to identify a quadrature minimum amplitude local oscillator (LO) frequency based on minimizing a quadrature amplitude of a transmit signal traversing an internal interfering path in a communication device.

12. The reconfigurable receiver of claim 11, wherein the processor is further configured to distinguish between a quadrature received signal in a reflected path from a target and an in-phase received signal in the internal interfering path based on configuring local oscillators in the communication device with the quadrature minimum amplitude LO frequency.

13. A method in a reconfigurable receiver, comprising:
mixing digital samples with a carrier phase estimate signal in a mixer and generating mixed digital samples based on the carrier phase estimate signal;
correlating the mixed digital samples and generating correlated data;
binning the correlated data in a symbol binning unit and generating a channel impulse response estimate; and
switching the digital samples to the symbol binning unit when the reconfigurable receiver is configured in radar mode and switching the correlated data to the symbol binning unit when the reconfigurable receiver is configured in a ranging mode.

14. The method in a reconfigurable receiver of claim 13, further comprising correlating pre-binned samples in a post-processing step when the reconfigurable receiver is in radar mode.

15. The method of claim 14, further comprising identifying an in-phase minimum amplitude local oscillator (LO) frequency based on minimizing an in-phase amplitude; of a transmit signal traversing an internal interfering path in a communication device.

16. The method of claim 15, further comprising distinguishing between an in-phase received signal in a reflected path from a target and an quadrature received signal in the internal interfering path based on configuring local oscillators in the communication device with the in-phase minimum amplitude LO frequency.

17. The method of claim 14, further comprising identifying a quadrature minimum amplitude local oscillator (LO) frequency based on a minimizing a quadrature amplitude, of a transmit signal traversing an internal interfering path in a communication device.

18. The method of claim 17, further comprising distinguishing between a quadrature received signal in a reflected path from a target and in-phase received signal in the internal interfering path based on configuring local oscillators in the communication device with the quadrature minimum amplitude local oscillator (LO) frequency.

* * * * *